US010880788B2

(12) United States Patent
Tomici et al.

(10) Patent No.: US 10,880,788 B2
(45) **Date of Patent: *Dec. 29, 2020**

(54) INTER-SYSTEM HANDOVER AND MULTI-CONNECTIVITY VIA AN INTEGRATED SMALL CELL AND WIFI GATEWAY

(71) Applicant: Convida Wireless, LLC, Wilmington, DE (US)

(72) Inventors: John L. Tomici, Southold, NY (US); Ahmed Mohamed, Pembroke Pines, FL (US); Michael F. Starsinic, Newtown, PA (US); Qing Li, Princeton Junction, NJ (US)

(73) Assignee: Convida Wireless, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/720,829

(22) Filed: Dec. 19, 2019

(65) Prior Publication Data

US 2020/0162969 A1 May 21, 2020

Related U.S. Application Data

(63) Continuation of application No. 15/325,740, filed as application No. PCT/US2015/040343 on Jul. 14, 2015, now Pat. No. 10,542,462.

(Continued)

(51) Int. Cl.

*H04W 36/00* (2009.01)
*H04W 76/12* (2018.01)

(Continued)

(52) U.S. Cl.

CPC ......... *H04W 36/0022* (2013.01); *H04W 8/26* (2013.01); *H04W 36/14* (2013.01);

(Continued)

(58) Field of Classification Search

CPC . H04W 36/0022; H04W 36/14; H04W 36/18; H04W 8/26; H04W 88/16;

(Continued)

(56) References Cited

U.S. PATENT DOCUMENTS

2010/0278108 A1 11/2010 Cho et al.
2010/0323700 A1* 12/2010 Bachmann ............ H04W 36/14 455/436

(Continued)

FOREIGN PATENT DOCUMENTS

CN 101753322 A 6/2010
CN 101945439 A 1/2011

(Continued)

OTHER PUBLICATIONS

3GPP TS 23.402 V13.1.0 (Mar. 2015) Technical Specification; 3rd Generation Partnership Project; Technical Specification Group Services and System Aspects; Architecture enhancements for non-3GPP accesses (Release 13) (Year: 2015).

(Continued)

*Primary Examiner* — Marcos Lo Torres
(74) *Attorney, Agent, or Firm* — BakerHostetler

(57) ABSTRACT

A system comprises an integrated small cell and WiFi (ISW) gateway (GW). The ISW GW is integrated with a mobility management entity (MME) and serving gateway (SGW) and has interfaces with both a 3GPP access network and a TWAN. The ISW GW operates as a common control gateway and a common user gateway for both LTE networks and TWANs. User equipment (UE) by means of the ISW GW is able to access the capabilities of a packet data network (PDN) through either the LTE network or TWAN. Further, the ISW GW provides for an existing communication connection between a UE and a PDN to be handed over from one of the LTE network or TWAN to the other. Still further, (Continued)

the ISW GW supports simultaneously maintaining two communication paths, one via the LTE network and one via the TWAN, between a UE and a packet network.

16 Claims, 22 Drawing Sheets

Related U.S. Application Data

(60) Provisional application No. 62/024,157, filed on Jul. 14, 2014.

(51) Int. Cl.

| | |
|---|---|
| ***H04W 36/14*** | (2009.01) |
| ***H04W 88/16*** | (2009.01) |
| ***H04W 8/26*** | (2009.01) |
| ***H04W 36/18*** | (2009.01) |
| *H04W 76/15* | (2018.01) |
| *H04W 84/04* | (2009.01) |
| *H04W 92/06* | (2009.01) |
| *H04W 84/12* | (2009.01) |

(52) U.S. Cl.
CPC .......... *H04W 36/18* (2013.01); *H04W 76/12* (2018.02); *H04W 88/16* (2013.01); *H04W 36/0011* (2013.01); *H04W 76/15* (2018.02); *H04W 84/045* (2013.01); *H04W 84/12* (2013.01); *H04W 92/06* (2013.01)

(58) Field of Classification Search
CPC . H04W 76/12; H04W 36/0011; H04W 76/15; H04W 84/045; H04W 84/12; H04W 92/06
See application file for complete search history.

(56) References Cited

U.S. PATENT DOCUMENTS

| | | | | |
|---|---|---|---|---|
| 2013/0077482 | A1 | 3/2013 | Krishna et al. | |
| 2014/0086211 | A1 | 3/2014 | Liu | |
| 2015/0282026 | A1* | 10/2015 | Gupta | H04L 1/0026 370/331 |
| 2016/0212667 | A1* | 7/2016 | Kim | H04W 40/36 |

FOREIGN PATENT DOCUMENTS

| | | | |
|---|---|---|---|
| CN | 102333386 | A | 1/2012 |
| CN | 103797888 | A | 5/2014 |
| EP | 3170360 | A1 | 5/2017 |
| JP | 2013-074453 | A | 4/2013 |
| WO | 2014/107358 | A1 | 7/2014 |
| WO | 2016/011001 | A1 | 1/2016 |

OTHER PUBLICATIONS

3GPP TSG SA WG2 #55 S2-063898, ETRI, SAE Deployment Scenarios for Separate MME Oct. 2006, 6 pages.
3rd Generation Partnership Project (3GPP), R3-102139, 3GPP RSG-RAN WG3 #69 Meeting, Principles for X2-GW Functionalities in HeNB GW, Aug. 2010, 4 pages.
3rd Generation Partnership Project; (3GPP) TR 23.852 V12.0.0 3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12), Sep. 2013, 157 pages.
3rd Generation Partnership Project; (3GPP) TS 22.234 V11.0.0, 3rd Generation Partnership Project; Technical Specification Group Services and System Aspects; Requirements on 3GPP system to Wireless Local Area Network (WLAN) Interworking (Release 11), Sep. 2012, 15 pages.
3rd Generation Partnership Project; (3GPP) TS 23.234 V11.0.0, 3rd Generation Partnership Project; Technical Specification Group Services and System Aspects; 3GPP system to Wireless Local Area Network (WLAN) interworking; System description (Release 11), Sep. 2012, 84 pages.
3rd Generation Partnership Project; (3GPP) TS 23.401 V12.3.0, 3rd Generation Partnership Project; Technical Specification Group Services and System Aspects; General Packet Radio Service (GPRS) enhancements for Evolved Universal Terrestrial Radio Access Network (E-UTRAN) access (Release 12), Dec. 2013, 302 pages.
3rd Generation Partnership Project; (3GPP) TS 23.402 V12.3.0, 3rd Generation Partnership Project; Technical Specification Group Services and System Aspects; Architecture enhancements for non-3GPP accesses (Release 12), Dec. 2013, 288 pages.
3rd Generation Partnership Project; (3GPP) TS 24.008 V12.4.0, 3rd Generation Partnership Project; Technical Specification Group Core Network and Terminals; Mobile radio interface Layer 3 specification; Core network protocols; Stage 3 (Release 12), Dec. 2013, 685 pages.
3rd Generation Partnership Project; (3GPP) TS 24.244 V1.0.0, 3rd Generation Partnership Project; Technical Specification Group Core Network and Terminals; Wireless LAN control plane protocol for trusted WLAN access to EPC; Stage 3 (Release 12), Feb. 2014, 25 pages.
3rd Generation Partnership Project; (3GPP) TS 29.273 V12.2.0, 3rd Generation Partnership Project; Technical Specification Group Core Network and Terminals; Evolved Packet System (EPS); 3GPP EPS AAA interfaces (Release 12), Dec. 2013, 137 pages.
3rd Generation Partnership Project; (3GPP) TS 29.274 V12.3.0, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12), Dec. 2013, 236 pages.
3rd Generation Partnership Project; (3GPP) TS 29.281 V11.6.0, 3rd Generation Partnership Project; Technical Specification Group Core Network and Terminals; General Packet Radio System (GPRS) Tunnelling Protocol User Plane (GTPv1-U) (Release 11), Mar. 2013, 27 pages.
3rd Generation Partnership Project; (3GPP) TS 33.402 V12.3.0, 3rd Generation Partnership Project; Technical Specification Group Services and System Aspects; 3GPP System Architecture Evolution (SAE); Security aspects of non-3GPP accesses (Release 12), Mar. 2014, 55 pages.
3rd Generation Partnership Project; (3GPP) TS 36.300 V12.1.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Mar. 2014, 209 pages.
3rd Generation Partnership Project; (3GPP) TS 43.318 V11.0.0, 3rd Generation Partnership Project; Technical Specification Group GSM/EDGE Radio Access Network; Generic Access Network (GAN); Stage 2 (Release 11), Sep. 2012, 128 pages.
International Patent Aplication No. PCT/US2015/040343: Preliminary Report on Patentability dated Jan. 26, 2017, 13 pages.
Tomici et al, "Integrated Small Cell and Wi-Fi Networks", 2015 IEEE Wireless Communications and Networking Conference (WCNC), IEEE, Mar. 9, 2015, 1261-1266.

* cited by examiner

INTER-SYSTEM HANDOVER AND MULTI-CONNECTIVITY VIA AN INTEGRATED SMALL CELL AND WIFI GATEWAY

CROSS REFERENCE TO RELATED APPLICATIONS

This application is a continuation of U.S. patent application Ser. No. 15/325,740 filed on Jan. 12, 2017 which is a 371 of PCT/US2015/040343 filed Jul. 14, 2015 which claims benefit under 35 U.S.C. § 119(e) of Provisional U.S. patent application No. 62/024,157, filed on Jul. 14, 2014, the contents of which are hereby incorporated herein by reference in their entireties.

BACKGROUND

As wireless communications technologies have evolved, additional demands have been placed on wireless systems to support more extensive use of diverse wireless networks. Mobile network operators (MNOs) have begun incorporating "carrier-grade" WiFi in ways that complement their cellular and core network services. For instance, MNOs have sought to employ WiFi, which refers to wireless local area networking technology based on IEEE 802.11, to offload Internet traffic from their cellular and core networks. MNOs have also sought to provide users of WiFi networks with access to the evolved packet core (EPC) of cellular systems.

While demand continues to increase for inter-system integration of cellular and WiFi networks, existing methods of providing such integration have proven to be resource intensive and too often result in interruptions in ongoing communications.

SUMMARY

Applicants disclose herein systems and methods for inter-system mobility in integrated long term evolution (LTE) and trusted WLAN access networks (TWAN). An example system comprises an integrated small cell and WiFi (ISW) gateway (GW) that is integrated with a mobility management entity (MME) and serving gateway (SGW) and has interfaces with both an HeNB/LTE access network and a TWAN. The ISW GW operates as both a common control gateway and a common user gateway for both LTE access networks and TWANs. The ISW GW receives control plane communications from both the LTE access network and TWAN and forwards the communications to the MME which operates as a common control plane for both LTE and TWAN access. Similarly, the ISW GW receives user plane communications from both the LTE access network and TWAN and forwards the communications to the SGW which operates as a common user plane for both the LTE access network and TWAN.

User equipment (UE) is able to access the capabilities of a packet data network (PDN) through either the LTE access network or TWAN via the ISW GW and its connections to the integrated MME and SGW. Moreover, an existing communication connection between a UE and a PDN may be handed over from one of the LTE access network or TWAN to the other. Still further, the MME and SGW provide for simultaneously maintaining two communication paths, one via the LTE access network and one via the TWAN, between a UE and a packet network.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Figure 1:
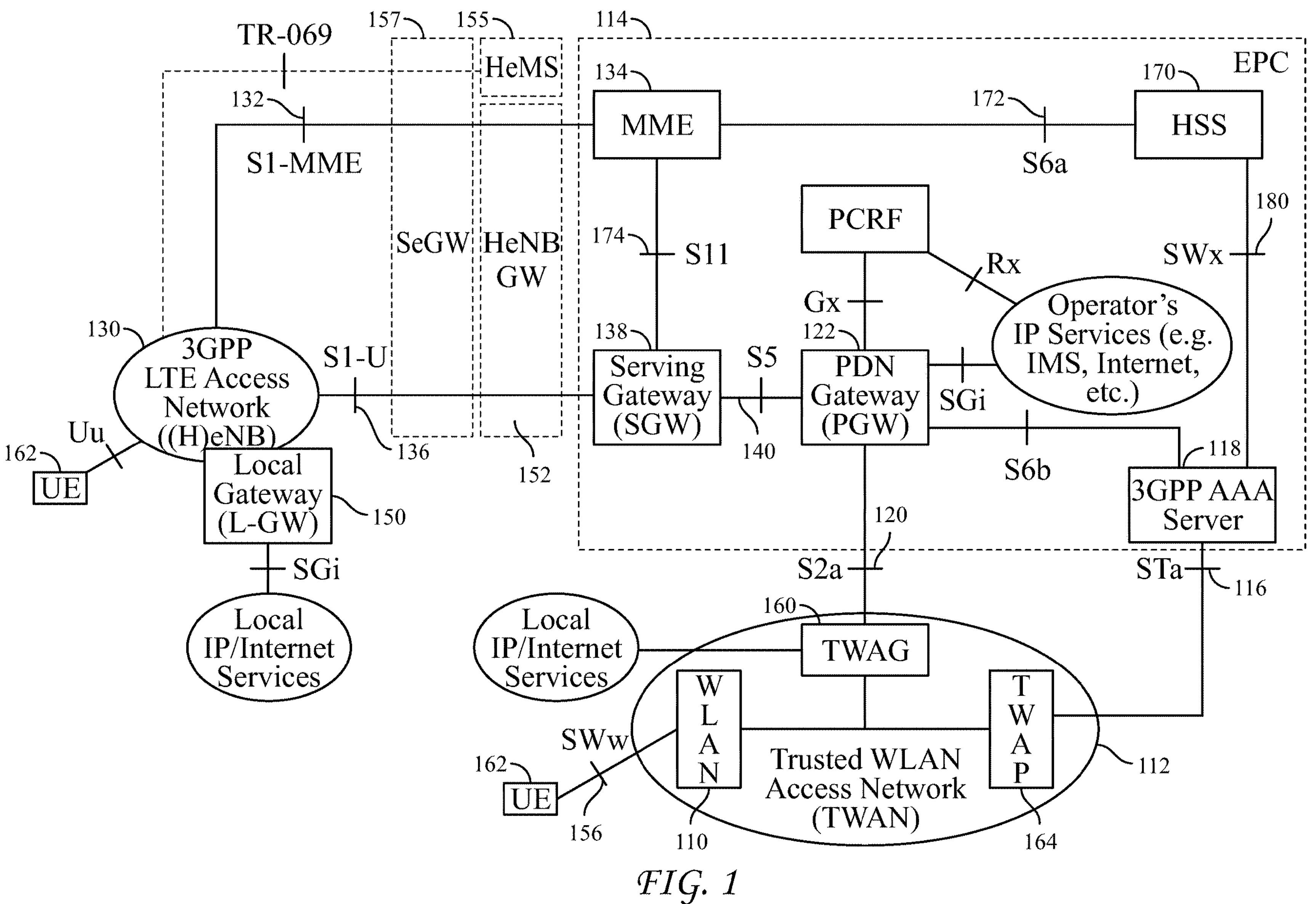
FIG. 1 depicts an example architecture for providing TWAN and 3GPP LTE access to a PDN.

Applicants disclose a system comprising an integrated small cell and WiFi (ISW) gateway (GW). The ISW GW is integrated with a mobility management entity (MME) and serving gateway (SGW) and has interfaces with both a 3GPP access network and a TWAN. The ISW GW operates as a common control gateway and a common user gateway for both LTE access networks and TWANs. The ISW GW receives control plane communications from both the LTE access network and TWAN and forwards the communications to the MME. The ISW GW receives user plane communications from both the LTE access network and TWAN and forwards the communications to the SGW.

User equipment (UE) by means of the ISW GW is able to access the capabilities of a packet data network (PDN) through either the LTE access network or TWAN. An existing communication connection between a UE and a PDN may be handed over from one of the LTE access network or TWAN to the other. Further, the MME and SGW provide for simultaneously maintaining two communication paths, one via the LTE access network and one via the TWAN, between a UE and a packet network.

Example Mobile Network Operations

Under current practices, mobile network operators (MNOs) typically employ WiFi for offloading "best effort" Internet traffic from their cellular and core networks. However, increased interest in operator deployment of "small cells" and "carrier WiFi" is expected to encourage MNOs to seek better inter-operability across local cellular and WiFi networks. Generally, "small cells" refer to localized geographic areas providing wireless network access via operator-licensed spectrum using 3GPP-defined cellular Radio Access Technologies (RATs).

As operators adopt "carrier WiFi" to optimize their networks and reduce expenses, it is expected that there will be a greater deployment of "Trusted" WLAN Access Networks (TWAN) that can interface directly with an operator's Mobile Core Network (MCN). Similarly, it is expected that there will be greater integration of MNO deployed small cell and WiFi access networks within common geographical areas such as high-traffic urban metropolitan hotspot locations. Such integration is motivated by the growing number of smartphones that support both cellular and WiFi access.

In this context, the term "trusted WLAN (TWAN) access" refers to the circumstances wherein appropriate measures have been taken to safeguard the EPC from access via the WLAN. Such measures are left to the discretion of the MNO and may, for example, include establishment of a tamper-proof fiber connection between the WLAN and EPC, or establishment of an IPSec security association between the WLAN and a Security Gateway at the EPC edge. In contrast, if the WLAN access is deemed "untrusted," the WLAN may interface with an evolved Packet Data Gateway (ePDG) at the EPC edge, and the ePDG must establish an IPSec security association directly with each UE accessing the EPC through the WLAN.

3GPP Activities Related to WLAN Access

The GPRS Tunneling Protocol (GTP) has been the standard transport protocol for packet data in 3GPP networks. In terms of inter-working with different types of non-3GPP networks (e.g., WLAN, WiMAX, CDMA2000), the IETF Proxy Mobile IP (PMIP) protocol has also been standardized as a general solution. With respect to WLAN access networks, in particular, there has been activity directed at standardizing procedures for 3GPP access using the GTP protocol. The activities were intended to enable subscriber access to the MNO's core network via lower cost unlicensed 802.11 spectrum in lieu of expensive cellular spectrum. Although operator adoption of generic access network (GAN), I-WLAN, and Untrusted WLAN has been very limited, interest in Trusted WLAN seems to be gaining momentum, especially with respect to the GTP-based option.

The 3GPP Release 11 SA2 work item for "S2a Mobility based on GTP & WLAN access to EPC" (SaMOG) focused on enabling a GTP-based S2a interface to the PDN Gateway (PGW) for "Trusted WLAN Access Networks" (TWANs). This item precluded any solutions that would impact the UE. The Release 11 architectures, functional descriptions, and procedures for GTP-based S2a over trusted WLAN access were subsequently standardized. The applicable GTP control plane protocol for tunnel management (GTPv2-C) and the GTP user plane have also been standardized. SaMOG has been extended as a Release 12 work item to address several Release 11 limitations and will include TWAN solutions for UE-initiated PDN connectivity, multi-PDN connectivity, and seamless inter-system handover.

3GPP Release 10 standardized a GTP-based S2b interface for Untrusted WLAN access to the EPC. This included the associated support for a GTP-based S2b interface between an evolved Packet Data Gateway (ePDG) and the PGW. Untrusted WLAN solutions may require UE support for IPSec as well as EPC support of an ePDG for establishing an IPSec tunnel with each UE.

3GPP Release 6 provided a standardized WLAN Interworking (I-WLAN) solution by introducing a Packet Data Gateway (PDG) for WLAN access to the "pre-EPC" packet-switched core network. This release additionally described how to reuse existing GGSN deployments to implement the PDG functionality using a subset of the Gn interface (denoted as Gn') via a "Tunnel Termination Gateway" (TTG) using GTP towards the GGSN. Again, these solutions may require UE support for IPSec as well as PDG/TTG support for establishing an IPSec tunnel with the UE.

3GPP Release 6 also standardized Generic Access Network (GAN) support for 2G/WiFi dual-mode handsets. Release 8 added support for 3G/WiFi handsets. Unlicensed Mobile Access (UMA) is the commercial name used by mobile carriers for GAN access via WiFi. GAN-enabled UEs can use WiFi to interface with a "GAN Controller" (GANC) that presents itself as a 2G BSC or 3G RNC to the core network. GANC provides a circuit-switched (CS) interface to the MSC, a packet-switched (PS) interface to the SGSN, and a Diameter EAP interface to the AAA Server/Proxy. It also includes a Security Gateway (SeGW) that terminates IPSec tunnels from the UE. Table 1 below illustrates the basic requirements for each GTP-based WLAN solution.

| | GAN/UMA (PS only shown) | I-WLAN | Untrusted WLAN | Trusted WLAN |
|---|---|---|---|---|
| Network Element | GANC | PDG/TTG | ePDG | TWAN |
| CN Interface | SGSN (or GGSN for Direct Tunnel support) | SGSN or GGSN | PGW | PGW |
| CN Protocols | GTP | GTP | GTP or PMIP | GTP or PMIP |
| UE Protocols | IKEv2/IPSec, EAP-AKA, Generic Access Radio | IKEv2/IPSec, EAP-AKA | IKEv2/IPSec, EAP-AKA | EAP-AKA', WLAN Control Protocol |

-continued

| GAN/UMA (PS only shown) | I-WLAN | Untrusted WLAN | Trusted WLAN |
|---|---|---|---|
| Resource Control (GARRC), NAS protocols tunneled between UE and SGSN | | | (WLCP) as defined for SaMOG Phase 2. |

Each of the above activities was intended to enable subscriber access to an operator's mobile core network via lower cost unlicensed 802.11 access points in lieu of expensive cellular base stations. Although operator adoption of GAN, I-WLAN, and Untrusted WLAN has been very limited, interest in Trusted WLAN is growing.

Existing Architecture for Cellular LTE and TWAN Access to EPC

FIG. 1 depicts an existing 3GPP architecture that provides cellular LTE and Trusted WLAN access to an EPC 114. As described in section 16.1.1 of 3GPP Technical Specification (TS) 23.402, the contents of which are hereby incorporated herein by reference in their entirety, when a WLAN 110 is considered trusted by the operator, the Trusted WLAN Access Network (TWAN) 112 can be connected to the Evolved Packet Core (EPC) 114 via the STa interface 116 toward the 3GPP AAA Server 118 for authentication, authorization, and accounting via the S2a interface 120 toward the PDN Gateway (PGW) 122 for user plane traffic flows. An alternate path from the TWAN to a local IP network and/or directly to the Internet is also shown.

The 3GPP LTE access network 130 (i.e., evolved Node B) is connected to the EPC 114 via the S1-MME interface 132 which provides a communication path with the Mobility Management Entity (MME) 134. The S1-U interface 136 provides a communication path with the Serving Gateway (SGW) 138, which interfaces with the PDN Gateway (PGW) 122 via the S5 interface 140.

An optional "local gateway" function (L-GW) 150 provides small cell LTE access, e.g., for Home eNB (HeNB) deployments. Similarly, an optional "HeNB Gateway" (HeNB GW) 152 may be used to concentrate control plane signaling for multiple HeNBs toward the MME 134 and could also be used to handle HeNB user plane traffic toward the SGW 138. An optional HeNB Management System (HeMS) 155 provides "plug-and-play" auto configuration of HeNBs based on TR-069 standards published by the broadband forum (BBF) and adopted by 3GPP. An optional security gateway (SeGW) 157 provides trusted access to the EPC via the HeNB 152.

Home eNodeB (HeNB)

3GPP refers to an LTE femtocell as a Home eNodeB (HeNB). The HeNB is designed as "plug-and-play" customer premises equipment (CPE) that can be installed in residential and enterprise environments without the need for an experienced technician. HeNBs may also be deployed in public venues including "hotspot" locations. HeNBs use a broadband Internet connection to access a remote HeNB Management System (HeMS) for automatic configuration, while also providing backhaul access the EPC network for cellular packet data services.

HeNBs operate in either closed, open or hybrid modes. Closed HeNBs only allow access to UEs that are part of an associated Closed Subscriber Group (CSG). Open HeNBs allow access to all subscribers. Hybrid HeNBs provide preferential treatment for associated CSG subscribers, but also allow access to other subscribers based on resource availability (possibly with reduced QoS).

In general, one of the main distinctions between HeNBs and eNBs is the "auto-configuration" feature using the TR-069 based HeMS. When an HeNB is powered-up with a broadband connection to the Internet, it accesses the HeMS based on DNS lookup using a pre-programmed "fully qualified domain name" (FQDN). From there, it receives all its configuration data including information for the Security Gateway (SeGW) to be used, and optionally the HeNB Gateway (HeNB GW) to be used.

Although other characteristics of a "small cell" eNB may be similar to those of an HeNB (e.g., reduced equipment cost, short range/low power operation, secure EPC access via SeGW, CSG restrictions, single/omni sector coverage, etc.), it is use of the HeMS and potential connectivity to an HeNB GW that distinguishes a HeNB from an eNB.

Trusted WLAN Access Network (TWAN)

WLAN Access Network (WLAN AN) 110 comprises one or more WLAN Access Points (APs). An AP terminates the UE's WLAN IEEE 802.11 link via the SWw interface 156. The APs may be deployed as standalone APs or as "thin" APs connected to a Wireless LAN Controller (WLC) using, for example, the IETF CAPWAP protocols.

Trusted WLAN Access Gateway (TWAG) 160 terminates the GTP-based S2a interface 120 with the PGW 122 and may act as the default IP router for the UE 162 on its WLAN access link. It also may act as a DHCP server for the UE 162. The TWAG 160 typically maintains a UE MAC address association for forwarding packets between the UE 162 (via the WLAN AP) and the associated S2a 120 GTP-U tunnel (via the PGW).

Trusted WLAN AAA Proxy (TWAP) 164 terminates the Diameter-based STa interface 116 with the 3GPP AAA Server 118. The TWAP 164 relays the AAA information between the WLAN AN 110 and the 3GPP AAA Server 118 (or Proxy in case of roaming). The TWAP 164 can inform the TWAG 160 of the occurrence of layer 2 attach and detach events. The TWAP 164 establishes the binding of UE subscription data (including IMSI) with UE MAC address and can provide such information to the TWAG 160.

Authentication and Security over TWAN in Existing Systems

In existing systems, the UE 162 can leverage USIM features for both 3GPP and non-3GPP WLAN access. Processing for authentication and security is described in section 4.9.1 of 3GPP TS 23.402, the contents of which are hereby incorporated by reference in their entirety. As described therein, non-3GPP access authentication, such as that which takes place via a WLAN, defines the process that is used for access control and thereby permits or denies a subscriber from attaching to and using the resources of a non-3GPP IP access which is interworked with the EPC network. Non-3GPP access authentication signaling is executed between the UE and the 3GPP AAA server 118 and HSS 170. The authentication signaling may pass through AAA proxies.

Trusted 3GPP-based access authentication is executed across an STa reference point 116. The 3GPP based access authentication signaling is based on IETF protocols, e.g., Extensible Authentication Protocol (EAP). The STa interface 116 and Diameter application are used for authenticating and authorizing the UE 162 for EPC access via trusted non-3GPP accesses. 3GPP TS 29.273, the contents of which are hereby incorporated by reference in its entirety, describes the standard TWAN procedures currently supported on the STa interface.

IP Address Allocation Over TWAN in Existing Systems

For EPC access via GTP-based TWAN, the IPv4 address and/or IPv6 prefix is allocated to the UE 162 when a new PDN connection is established with the EPC 114 over the TWAN 112. A separate IP address may also be allocated by the TWAN 112 for local network traffic and/or direct Internet offload.

For PDN connectivity through EPC 114 via the TWAN 112, the TWAN 112 receives relevant PDN information via EAP/Diameter or WLCP signaling. The TWAN 112 may request an IPv4 address for the UE 162 from the PGW 122 via the GTP Create Session Request. The IPv4 address is delivered to the TWAN 112 during the GTP tunnel establishment via the GTP Create Session Response. When the UE 162 requests an IPv4 address for PDN connectivity via DHCPv4, the TWAN 112 delivers the received IPv4 address to the UE 162 within DHCPv4 signaling. Corresponding procedures are also defined for IPv6.

Existing Procedures for Access Via LTE

For 3GPP LTE access, the UE 162 automatically triggers a PDN connection as part of its initial attachment to the EPC network 114. The UE 162 may subsequently establish additional PDN connections as needed.

The primary purpose of the attach procedure is for the UE 162 to register with the network in order to receive services for which it has subscribed to. The attach procedure confirms the user's identity, identifies the services it is allowed to receive, establishes the security parameters (e.g., for data encryption), and notifies the network of the UE's initial location (e.g., in case it needs to be paged). Also, to support the "always-on" network connectivity expected by today's users, the LTE standards specify establishment of a default PDN connection as part of the Attach procedure. The radio resources for this default connection may be released during periods of inactivity, however the rest of the connection remains intact and the end-to-end connection can be quickly re-established by reassigning the radio resources in response to UE service requests.

When a UE 162 attempts to attach to the EPC 114 via an (H)eNB LTE access network 130, it first establishes an RRC connection with the (H)eNB LTE access network 130 and encapsulates the Attach Request within the RRC signaling. The (H)eNB LTE access network 130 then forwards the attach request to the MME 134 via S1-AP signaling on the S1-MME interface 132. The MME 134 retrieves subscription information from the HSS 170 via the S6a interface 172 in order to authenticate the UE 162 and allow attachment to the EPC 114.

After successfully authenticating the UE 162, the MME 134 selects an SGW 138 (e.g., based on proximity to the (H)eNB LTE access network 130), and also selects a PGW 122 (e.g., based on the default APN retrieved from HSS 170 or a specific APN requested by UE 162). The MME 134 communicates with the SGW 138 over the S11 interface 174 and requests creation of the PDN connection. The SGW 138 executes the signaling to establish a GTP user plane tunnel with the designated PGW 122 over the S5 interface 140.

"GTP control" signaling takes place within the S1-AP protocol between the MME 134 and (H)eNB 130. This ultimately leads to the establishment of a GTP user plane tunnel on the S1-U interface 136 between (H)eNB 130 and SGW 138. The path for the PDN connection between the UE 162 and PGW 122 is thus completed through the (H)eNB 130 and SGW 138.

Existing Procedures for EPC Access Via TWAN

In existing systems where communications take place via the TWAN 112, UE 162 authentication and EPC 114 attachment is accomplished via EAP signaling between the UE 162 and 3GPP AAA Server 118.

The PDN connectivity service is provided by the point-to-point connectivity between the UE 162 and the TWAN 112, concatenated with S2a bearer(s) 120 between the TWAN 112 and the PGW 122. Unlike the LTE model, the WLAN radio resources are "always-on" from an EPC perspective. In other words, any power-saving optimizations are handled transparently using IEEE 802.11 procedures within the WLAN.

When a UE 162 attempts to attach to the EPC 114 via a TWAN 112, it first establishes a Layer 2 connection with the WLAN 110 and encapsulates EAP messages within EAPoL signaling. The WLAN 110 forwards the EAP messages to a TWAP 164 which encapsulates the messages within Diameter signaling and forwards the messages to the 3GPP AAA Server 118 via the STa interface 116. The 3GPP AAA Server 1118 retrieves subscription information from the HSS 170 via the SWx interface 180 in order to authenticate the UE 162 and allow attachment to the EPC 114.

For 3GPP Release 11, the 3GPP AAA Server 118 also provides the TWAN 112 with information via STa interface 116 for establishing a PDN connection to the default PDN provisioned in the HSS 170. The TWAN 112 then exercises GTP control plane (GTP-C) and user plane (GTP-U) protocols over the S2a interface 120 directly toward the PGW 122, thereby completing the PDN connection between the UE 162 and PGW 122 through the TWAN 112.

For 3GPP Release 12, the SaMOG phase-2 work item defines additional procedures for UE-initiated PDN connectivity, multi-PDN connectivity, and seamless inter-system handover. For the case of single-PDN capable TWAN scenarios, EAP extensions are defined to support UE-initiated PDN requests and seamless inter-system handover requests. For the case of multi-PDN capable TWAN scenarios, a WLAN Control Protocol (WLCP) is defined between the UE and TWAN to enable one or more UE PDN connection requests and seamless handover procedures. However, separate procedures are still utilized between the UE and 3GPP AAA Server for UE authentication.

Existing Procedures for HeNB Gateway (NeNB GW)

Section 4.6 of 3GPP TS 36.300, the contents of which are hereby incorporated by reference herein in their entirety, describes the Stage 2 architecture, functions, and interfaces to be supported by HeNBs and HeNB GWs. As described therein, the E-UTRAN architecture may deploy a Home eNB Gateway (HeNB GW) to allow the S1 interface between the HeNB and the EPC to support a large number of HeNBs in a scalable manner. The HeNB GW serves as a concentrator for the C-Plane, specifically the S1-MME interface. The HeNB GW appears to the MME as an eNB. The HeNB GW appears to the HeNB as an MME.

Selection of an MME at UE attachment is hosted by the HeNB GW instead of the HeNB. The HeNB GW relays Control Plane data between the HeNB and the MME. The HeNB GW terminates the non-UE-dedicated procedures—both with the HeNB, and with the MME. The scope of any protocol function associated to a non-UE-dedicated procedure is between HeNB and HeNB GW and/or between HeNB GW and MME. Any protocol function associated to a UE-dedicated-procedure resides within the HeNB and the MME only. The HeNB GW may optionally terminate the user plane towards the HeNB and towards the S-GW, and relay User Plane data between the HeNB and the S-GW.

Figure 2:
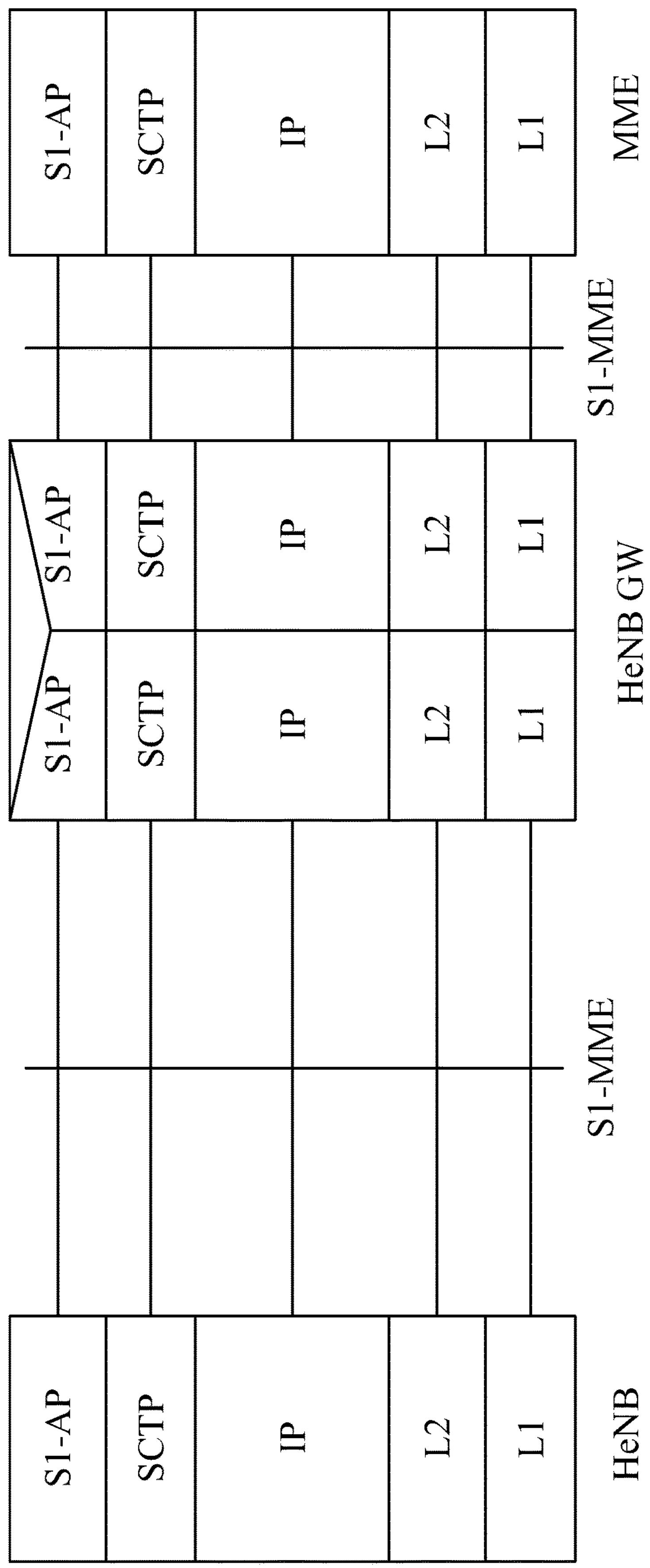
FIG. 2 depicts an example HeNB control plane protocol stack.

FIG. 2 depicts the HeNB GW protocol stacks for the control plane in existing systems. As shown, pursuant to existing methods the HeNB GW interfaces with the HeNB and MME over an S1-MME interface. Control plane concentration on the S1-MME interface is useful for minimizing the number of SCTP connections to the MME. This improves the scaling/loading on the MME. For example, it is possible to have one SCTP/IP association between HeNB GW and MME while still supporting multiple signaling streams between HeNB GW and different HeNBs.

Figure 3:
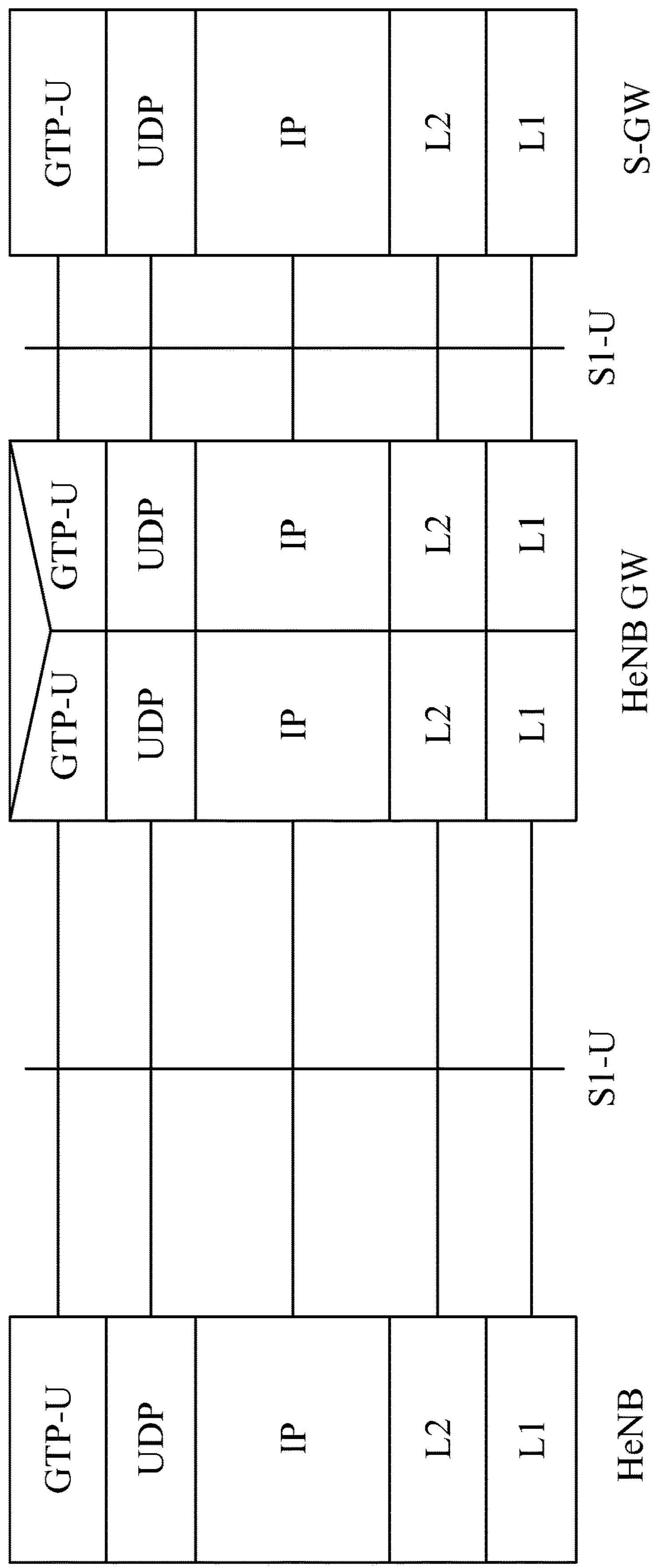
FIG. 3 depicts an example HeNB user plane protocol stack.

FIG. 3 depicts the HeNB GW protocol stack for the user plane in existing systems. As shown, pursuant to existing methods the HeNB GW interfaces with the HeNB and S-GW over an S1-U interface. With user plane termination in the HeNB GW, user plane concentration can be performed by reducing the number of UDP/IP paths between the SGW and HeNB GW while still supporting multiple GTP tunnels. The different GTP tunnels are distinguishable by their TEIDs.

Inter-System Handover and Multi-Connectivity Via an Integrated Small Cell and WiFi Gateway As the above description illustrates, under current practices, cellular network and WiFi interworking occurs in the PGW. This was seen as the least disruptive solution for inter-working WiFi hotspots into the EPC core along with existing macrocell deployments. Macrocell coverage was typically viewed as ubiquitous, while the availability of opportunistic WiFi hotspots was intermittent. Such inter-working is typically slow as it requires access and control by devices within the core of the EPC. Furthermore, communications that are reliant upon processing at the core of the network have an increased opportunity to be disrupted as the communications travel to and from the network core. The existing model does not scale well for the large number of small cell and "trusted" WLAN deployments anticipated in the near future.

Given the anticipated deployment of many co-located small cell and WiFi access points, Applicants have noted that it would be beneficial to standardize some inter-working functionality closer to the small cell and WiFi access points. In some mobility and multi-access scenarios, such a capability could reduce user plane switching delays across access technologies and minimize the amount of signaling through the MCN to the PGW.

Home eNodeB Gateways (HeNB GW) currently support signaling concentration (SCTP/IP) from multiple HeNBs toward the EPC (MME). In addition, they may optionally support user plane concentration (UDP/IP) while providing packet relay functionality toward the EPC (SGW). The HeNB GW standards do not support interaction with WiFi access points. The HeNB GW is able to concentrate signaling that originates from a cellular RAT, but not a Wi-Fi RAT.

Applicants disclose herein improved systems and methods for inter-system mobility in integrated wireless networks. More particularly, Applicants disclose a system comprising an integrated small cell and WiFi (ISW) gateway (GW). The ISW GW is integrated with a mobility management entity (MME) and serving gateway (SGW) and has interfaces with both a 3GPP access network and a TWAN. The ISW GW operates as a common control gateway and a common user gateway for both LTE networks and TWANs. User equipment (UE) by means of the ISW GW is able to access the capabilities of a packet data network (PDN) through either the LTE network or TWAN. Further, the ISW GW provides for an existing communication connection between a UE and a PDN to be handed over from one of the LTE network or TWAN to the other. Still further, the ISW GW supports simultaneously maintaining two communication paths, one via the LTE network and one via the TWAN, between a UE and a packet network.

Architecture for Inter-System Mobility in Integrated WLAN and LTE Networks

Figure 4:
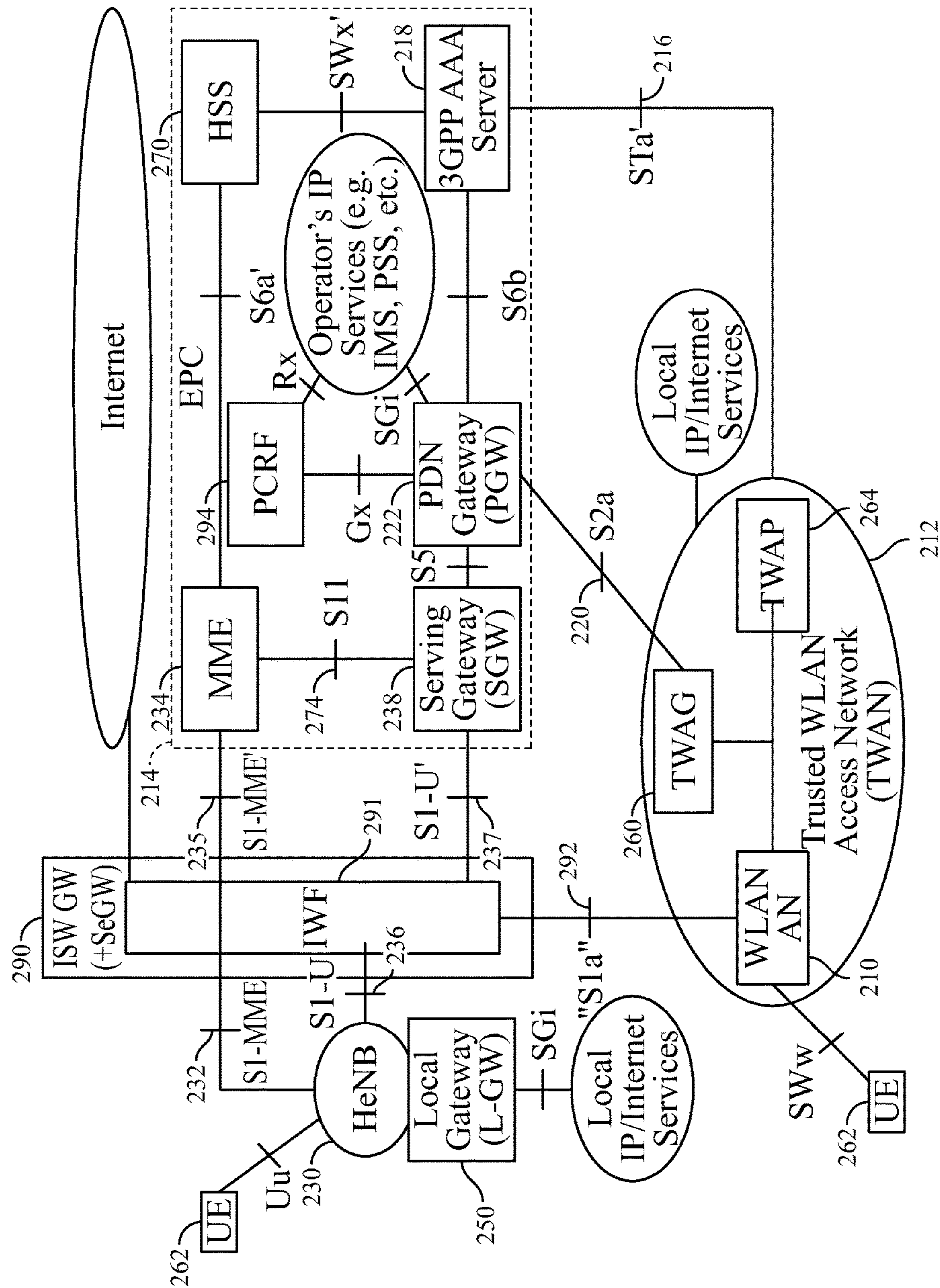
FIG. 4 depicts an example system for providing integrated HeNB/LTE and TWAN access to a PDN.

FIG. 4 depicts an example embodiment of an improved system for providing inter-system mobility in integrated WLAN and HeNB/LTE networks. As shown, in an example embodiment, the system comprises an integrated small-cell and WiFi (ISW) gateway (GW) 290. The ISW GW 290 provides a common control plane and user plane for both HeNB 230 and WLAN 210 access to the PDN of the EPC 214.

A new interface "S1a" 292 supports both control plane and user plane communications between the TWAN 212 and the ISW GW 290. In the example embodiment of FIG. 4, the interface S1a terminates in the WLAN AN 210 of TWAN 212. The S2a interface 220 may be used to support legacy deployments such as might arise when the UE 262 is not connected via an ISW-GW.

The ISW GW 290 interfaces with HeNB network 230 over control plane interface S1-MME 232 and user plane interface S1-U 236. It will be appreciated that in an example embodiment, ISW GW 290 incorporates functionality that has traditionally been provided by HeNB GW 152 (FIG. 1). ISW GW 290 may further provide functionality that has traditionally been provided by SeGW 157 and HeMS 155 (FIG. 1).

The ISW GW 290 interfaces with the MME 234 over SW-MME' control plane interface 235, and communicates with SGW 238 over S1-U' user plane interface 237. Control plane interface SW-MME' 235 operates substantially as prior SW-MME interfaces, but has been extended to accommodate the processing as described herein. The MME 234 controls the setup of the GTP-U tunnels between the HeNB/WLAN and the SGW 238 via the ISW GW 290. The MME 234 controls "IP flow" mobility in the ISW GW 290 to/from a single PDN across either access (HeNB or WLAN) based on local conditions and policies.

User plane interface S1-U' 237 operates substantially as prior S1-U interfaces, but has been extended to accommodate the processing as described herein. The SGW 238 processes GTP-U data related to both the HeNB and WLAN access, although the SGW 238 may not necessarily be aware that it is carrying WLAN-based GTP packets.

As shown, ISW GW 290 comprises inter-working function (IWF) 291. IWF 291 is adapted to provide traffic management and to route data between and amongst the TWAN 212, the HeNB 230, the MME 234, and the SGW 238 as described below in connection with FIG. 5.

With the S1a, S1-MME, S1-MME', S1-U, and S1-U' interfaces in place, the ISW GW 290 operates as a common control plane entity and user plane entity for both HeNB/LTE network 230 and TWAN 212 access. ISW GW 290 relies upon MME 234 to provide common control plane services for HeNB/LTE access network 230 and TWAN 212 access, and relies upon SGW 238 to provide common user plane services for both HeNB/LTE access network 230 and TWAN 212 access. As described in detail below in connection with FIG. 8, the ISW GW 290 and integrated MME 234 and SGW 238 allow for user equipment (UE) 262 to access the capabilities of a packet data network (PDN) through either the HeNB/LTE network 230 or TWAN 212. Moreover, and as described in detail in connection with FIGS. 9 and 11, an existing communication connection between a UE 262 and a PDN 222 may be handed over from one of the HeNB/LTE network 230 or TWAN 212 to the other. Still further, and as described below in connection with FIGS. 10 and 12, the ISW GW 290 and integrated MME 234 and SGW 238 provide for simultaneously maintain two communication paths, one via the HeNB/LTE network 230 and one via the TWAN 212, between a UE 262 and a packet network 222.

As noted above, interfaces S1-MME' 235 and S1-U' 237 operate consistent with previously existing interfaces S1-MME and S1-U but have been extended to provide the functionality as described herein. The SWw', Sta', SWx', and S6a' interfaces likewise operate consistent with existing protocols, but have been extended with additional information elements to support the disclosed functionality. Interfaces carrying extended protocols are denoted with an apostrophe (').

According to an aspect of the disclosed embodiments, the GTPv2-C and GTP-U protocols may be used over the new S1a interface 292, with appropriate extensions as required. The GTPv2-C based extensions are sufficient to implement the features disclosed herein. In an alternative embodiment, a new "S1a-AP" protocol based on the S1-AP protocol may be defined to convey the same information as the GTPv2-C extensions and may also use SCTP/IP instead of UDP/IP.

In an example embodiment, the transport network connection on the S1a interface between trusted WLAN and ISW-GW may be established using extensions to Operation, Administration, and Maintenance (OAM) procedures. These and other OAM procedures may be implemented via trusted WLAN extensions to the TR-069 protocols as has previously been defined for a HeNB configuration.

Figure 5:
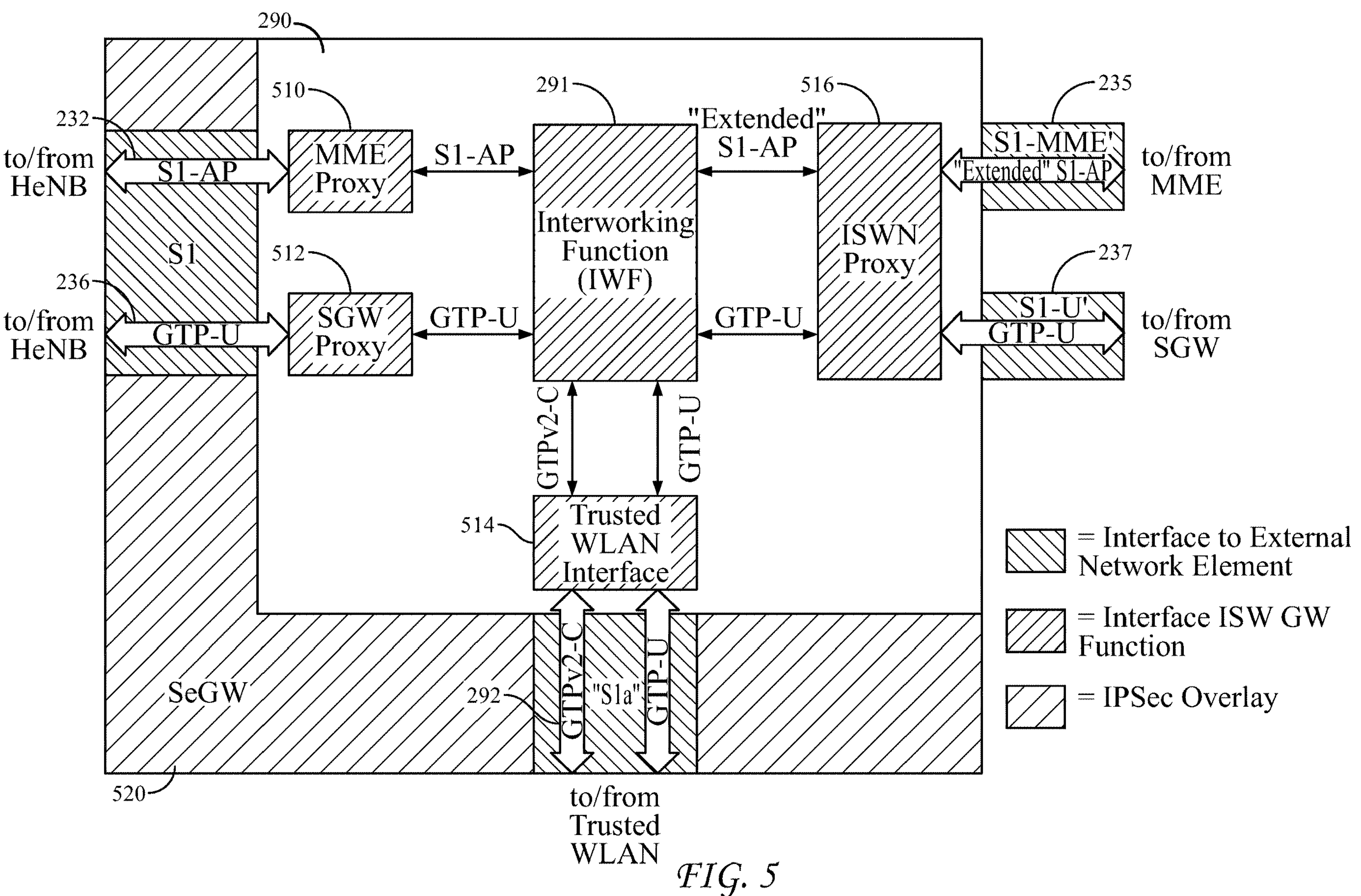
FIG. 5 depicts functional components of an integrated small cell and WiFi gateway (ISW GW).

FIG. 5 depicts a block diagram illustrating functional components of an ISW GW 290. The ISW-GW 290 lies between the HeNB 230 and MME 234. The ISW-GW 290 communicates with the HeNB 230 as if the ISW GW 290 were an MME 234. In other words, the ISW GW 290 transmits and receives standard HeNB-MME messages using the standard S1-AP protocol. Accordingly, as depicted in FIG. 5, ISW GW 290 comprises an MME proxy 510 which employs the standard MME stack and communicates with the HeNB over the standard S1-MME reference point. One function of the MME proxy is to receive the information from the HeNB using S1-AP and feed it to the Interworking Function (IWF) 291, which coordinates processing within the ISW GW 290.

The SGW proxy 512 operates in a similar manner to the MME proxy 510, but does so for the user plane.

The Trusted WLAN Interface or proxy 514 operates as a proxy for TWAN control and user planes. One function of the TWAN interface 514 is to convey the TWAN user/control planes to the IWF. In an example embodiment, the control plane may be communicated using the GTPv2-C tunneling protocol. The user plane may be communicated using the GTP-U tunnel protocol. Both user and control planes are carried over S1a interface reference point 212.

The IWF 291 communicates the control plane information of both the HeNB 230 and WLAN 210, via an ISW network (ISWN) proxy 516, to the MME 234. In other words, the ISWN proxy 516 is responsible for conveying the control plane information from the IWF 291 to the MME 234 over the S1-MME' reference point 235. Once the MME 234 has received the control plane information about the HeNB 230 and WLAN 210, the MME 234 may apply a traffic management policy. The policy could be derived from ANDSF information conveyed by the UE 262, HSS information received based on the UE's subscription, or local conditions perceived at the MME 234. The IWF 291 is primarily responsible for executing the traffic management policy and routing the user plane accordingly, either to the HeNB 230 or the TWAN 212. In the downlink, for example, if the WiFi air interface has a low congestion ratio and the MME 234 determines to utilize it instead of the LTE air interface, the MME 234 sends a decision to the IWF 291 via the ISWN proxy 516 in order to activate the WiFi path. As a result, the user plane is received at the IWF 291 from the SGW 238 and directed by the IWF 291 to the WLAN 210 via the TWAN interface 514.

In an example embodiment, a Security Gateway (SeGW) 520, which is a standard entity of the EPC architecture, may be added to the ISW-GW 291. It may be positioned at the interface between the HeNB/TWAN and the ISW-GW to guarantee the security of accessing the EPC.

TWAN, MME and HeNB-GW Extensions for ISW Inter-System Mobility

As has been noted above, existing system components including, for example, the TWAN, MME, and HeNB-GW, have been modified or extended in order to support the disclosed systems and methods.

The disclosed systems and methods, consistent with the 3GPP Release 12 SaMOG phase-2 enhancements, support "multi-PDN capable" TWAN scenarios. In multi-PDN TWAN scenarios, the UE 262 and network can support multiple simultaneous PDN connections via the TWAN 212. For multi-PDN TWAN scenarios, the UE 262 initiates the WLAN attach procedure via EAP signaling with the 3GPP AAA Server 218. The PDN connection establishment procedure(s) are initiated via WLAN Control Protocol (WLCP) signaling with the TWAN 212.

In order to support the processing disclosed herein, the trusted WLAN 210 communicates with the "ISW-enabled" HeNB-GW, i.e., the "ISW GW" 290, via the "S1a" interface 292 using GTPv2-C in the control plane and GTP-U in the user plane.

As part of the ISW network configuration procedures, the management system directs the WLAN 210 to the appropriate Security Gateway (SeGW) and ISW GW 290. For simplicity, this disclosure considers that the SeGW 520 is collocated with the ISW-GW 290 as shown in FIG. 5. For the case of standalone HeNB and WLAN, separate security associations could be established with the SeGW.

According to aspect of the disclosed embodiments, protocol extensions in the UE 262 and 3GPP AAA Server 218 support the exchange of additional EAP signaling information for trusted WLAN 210 access in ISW GW 290 enabled TWAN 212 scenarios. In addition, protocol extensions in the UE 262 and trusted WLAN 212 support the exchange of additional WLCP-based signaling on the SWw interface for TWAN access in ISW GW enabled TWAN scenarios.

According to another aspect of the disclosed embodiments, the trusted WLAN 210 and HeNB-GW 290 have been modified or extended to support the new S1a interface 292 with new GTPv2-C control plane and GTP-U user plane procedures between the TWAN 212 and extended HeNB-GW, i.e., ISW GW 290.

Protocol extensions in the MME support extended S1-AP procedures for TWAN to PDN connection and inter-system traffic management.

GW 290, the GTPv2-C and UDP/SCTP protocols may be extended to support the disclosed processing.

Figure 7:
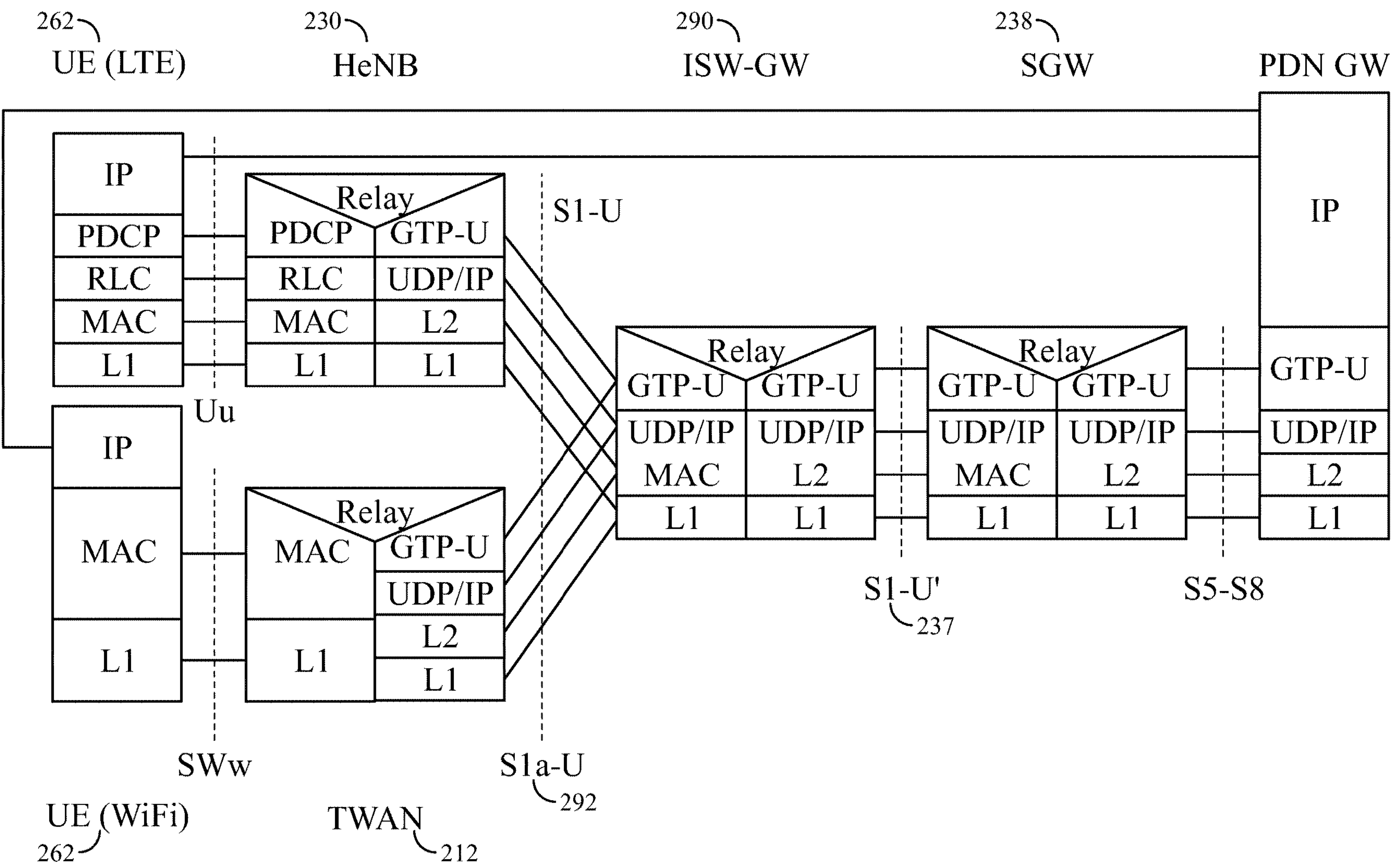
FIG. 7 depicts example protocol stacks for a user plane in a system comprising an ISW GW.

FIG. 7 depicts an example protocol stack consistent with the disclosed embodiments. In the example embodiment, the S1a interface 292 has been introduced and provides an interface on the user plane for communications over the TWAN 212 to the ISW GW 290. In an example scenario, the GTP-U protocol may be extended in order to support the communications over the S1a interface. The S1-U' interface 237 between the ISW GW 290 and SGW 238 has been extended to provide support for both LTE and TWAN access.

The following discussion illustrates some of the enhancements that may be made to the existing Diameter, WCLP, NAS, GTP, and S1-AP protocols in support of the disclosed systems and methods.

Diameter Protocol Extensions

According to an aspect of the disclosed embodiments, the Diameter signaling may be extended to allow the TWAN 212 to communicate its expanded capabilities to the 3GPP AAA Server 218. For example, the "Access Type" information element may be extended to include "ISW-enabled TWAN" as one of the potential access types. The TWAN capability also indicates its connectivity to an ISW GW.

The following chart summarizes various Diameter extensions that may be incorporated into aspects of the disclosed embodiments.

| Message Direction | Diameter Message | New/Modified Informaiton Element (IE) | Purpose |
|---|---|---|---|
| TWAN to 3GPP AAA Server (STa) | Diameter-EAP-Request (DER) | Access Type: "ISW TWAN" | May define "ISW-TWAN" as a new Access Type; alternatively, the ISW-TWAN capability may be included in a new "ISW capability" IE as shown below |
| | | ISW Capabilities | New IE providing the following info: ISW-TWAN Connected ISW GW |

In an example embodiment of the disclosed systems and methods, authentication and security procedures occur per existing standard mechanisms using the STa, SWx, and S6a interfaces with, possibly, a few enhancements. For example, the STa (STa') interface may be extended between 3GPP AAA Server 318 and TWAN 212 to enable the exchange of additional ISW-based information. Similarly, the SWx (SWx') interface between HSS 270 and 3GPP AAA Server 218 may be extended to enable exchange of additional ISW-based information. Further, the S6a (S6a') interface between the HSS 270 and the MME 234 may be extended to enable the exchange of additional ISW-based information.

Protocol Architecture

Figure 6:
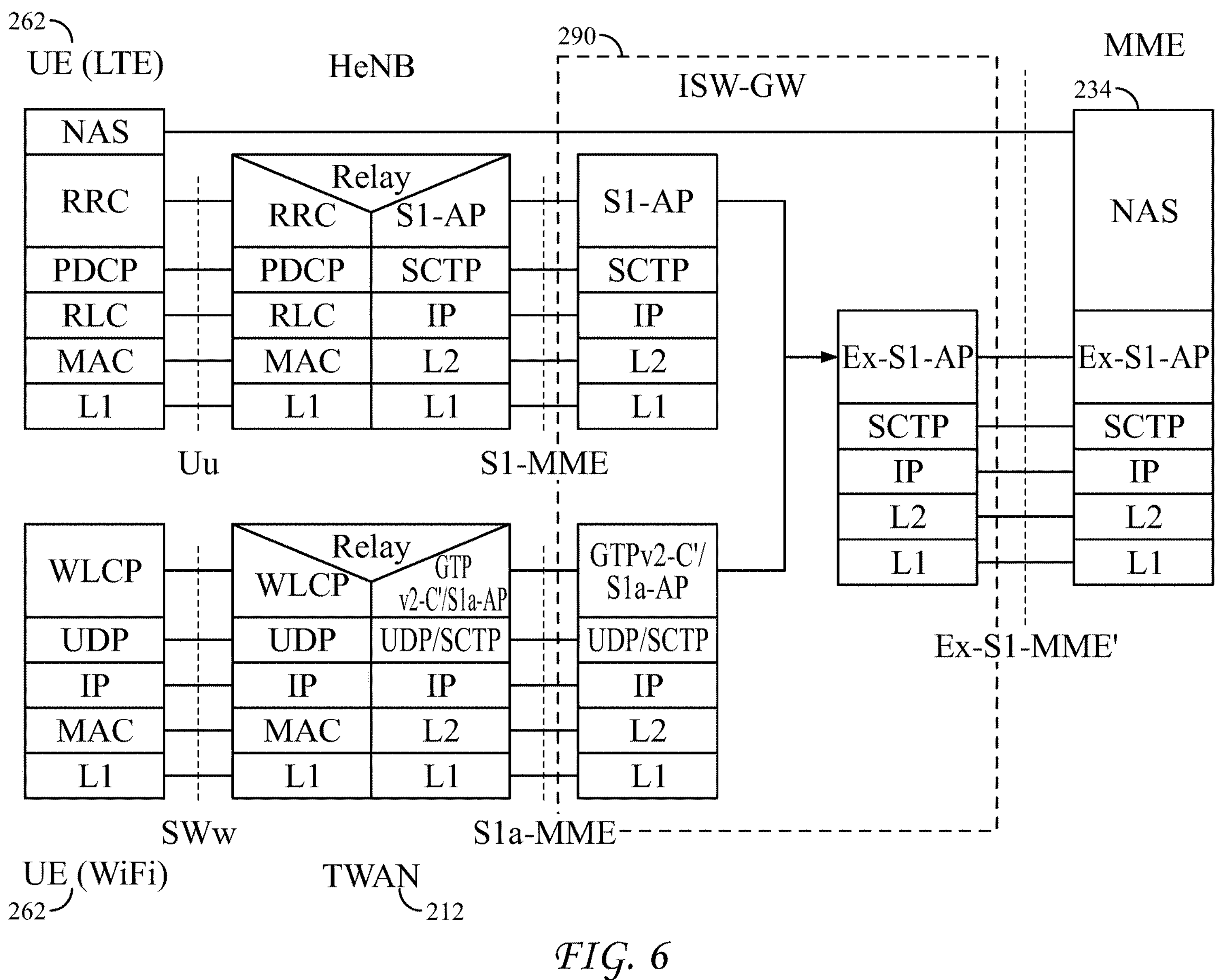
FIG. 6 depicts example protocol stacks for a control plane in a system comprising an ISW GW.

As noted from the above discussion, the disclosed systems and methods employ existing protocols and interfaces. However, in several instances, existing protocols and interfaces have been extended in order to support the disclosed processing. Further, in a few instances, new protocols and interfaces have been created. FIG. 6 depicts an example protocol stack consistent with the disclosed embodiments. As shown, an extended interface S1-MME' operates between MME 234 and ISW-GW 290. The S1-AP protocol that is used over the S1-MME' interface, and which is denoted "Ex-S1-AP," may be extended to provide the processing as described herein. With respect to the newly presented S1a interface between the TWAN 212 and ISW WLCP Protocol Extensions Generally, the NAS Session Management (SM) protocol defined in 3GPP TS 24.008, the contents of which are hereby incorporated herein by reference, discloses the WLCP protocol that may be used to implement the systems and methods disclosed herein. According to one embodiment, the Activate PDP Context Request/Accept/Reject and Deactivate PDP Context Request/Accept message types may be adapted as needed to accommodate the described processing. The WLCP Stage 3 specification is 3GPP TS 24.244, the contents of which are hereby incorporated by reference herein in their entirety.

With respect to inter-system handover in the "multi-PDN" scenario, the WLCP signaling described for SaMOG phase-2 supports use of a "handover" request type along with an identification of the "APN" for the PDN connection to be handed over. In connection with processing of a request for an inter-system multi-connection, a new indicator for "multi-connection" may be defined which includes the "APN" for the PDN connection with which the connection is to be made.

The following chart summarizes WCLP extensions that may incorporated into embodiments of the disclosed systems and methods.

| Message Direction | WLCP Message | New/Modified Information Element | Purpose | Comment |
|---|---|---|---|---|
| UE to TWAN | PDN Connectivity Request | Request Type - add “multi-connection” to existing “initial” and “handover” request types | Indicates to the network that UE wants to maintain a PDN connection simultaneously over both LTE and WiFi access | Applies only to “multi-PDN” TWAN scenarios |
| | | Multi-connection access routing policy | Provides option to convey UE’s multi-connection access routing policy, e.g., from ANDSF, to MME via ISW GW | This information could be included as an extension to the “additional parameter list” in the Protocol Configuration Options (PCO) information element |

NAS Protocol Extensions

With respect to the non access stratum (NAS) protocol, a new indicator for “multi-connection” is defined. When the UE has an existing PDN connection via TWAN, the UE may request a “multi-access connection” via extensions to the LTE attach and PDN connection procedures specified in 3GPP TS 23.401, the contents of which are hereby incorporated herein by reference. In addition to the initial attach and handover indication, the disclosed systems and methods may employ a multi-connection indication.

The following chart summarizes the NAS extensions that may incorporated into embodiments of the disclosed systems and methods.

| Message Direction | NAS Message | New/Modified Information Element | Purpose | Comment |
|---|---|---|---|---|
| UE to MME | Attach Request | ESM Message Container/ Request Type - add “multi-connection” to existing “initial” and “handover” request types | Indicates to the network that UE wants to maintain a PDN connection simultaneously over both LTE and WiFi access | Applies to initial PDN connection triggered by Attach Request |
| UE to MME | PDN Connectivity Request | Request Type - add “multi-connection” to existing “initial” and “handover” request types | Indicates to the network that UE wants to maintain a PDN connection simultaneously over both LTE and WiFi access | Applies to subsequent PDN connections established after initial attach |

GTPv2-C Protocol Extensions

The GTPv2-C protocol may also be extended in connection with the systems and methods disclosed herein. For example, the indication flags in the GTP-C “Create Session Request” may be expanded to include a value for “multi-connection” in addition to the existing “handover indication.” Additional information such as UE MAC address and VLAN ID may also be conveyed via the GTPv2-C signaling to the ISW GW.

The following chart summarizes the gtpV2-C extensions that may incorporated into embodiments of the disclosed systems and methods.

| Message Direction | GTPv2-C Message | New/Modified Information Element | Purpose | Comments |
|---|---|---|---|---|
| TWAN to ISW GW, MME to SGW, SGW to PGW | Create Session Request | Indication Flags - add "multi-connection" indication in addition to existing "handover" indication | Indicates to the network that UE wants to maintain a PDN connection simultaneously over both LTE and WiFi access | |
| | | Multi-connection access routing policy | Provides option to convey UE's multi-connection access routing policy to the network | This information could be included as an extension to the "additional parameter list" in the Protocol Configuration Options (PCO) information element |
| | | WLAN 802.11 MAC Address, UE 802.11 MAC Address, Session VLAN ID | Facilitates packet routing and tunnel management by ISW GW | |

S1-AP Protocol Extensions

The S1-AP protocol may be extended to transport the GTPv2-C based "Create Session Request" and "Create Session Response" messages. The indication flags in the GTP-C "Create Session Request" may be expanded to include a value for "multi-connection" in addition to the "handover". Also, additional information such as UE MAC address and VLAN ID may be conveyed for routing decisions by the MME.

The following chart summarizes the S1-AP extensions that may incorporated into embodiments of the disclosed systems and methods.

| Message Direction | New "Ex-S1-AP" Message | New/Modified Information Element | Purpose | Comments |
|---|---|---|---|---|
| ISW GW to MME | Create Session Request | Indication Flags - add "multi-connection" indication in addition to existing "handover" indication | Indicates to the network that UE wants to maintain a PDN connection simultaneously over both LTE and WiFi access | |
| | | WLAN 802.11 MAC Address, UE 802.11 MAC Address, Session VLAN ID | Facilitates packet routing and tunnel management by ISW-enabled MME | |
| | | Multi-connection access routing policy | Provides option to convey UE's multi-connection access routing policy to the network | This information could be included as an extension to the "additional parameter list" in the Protocol Configuration Options (PCO) information element |
| MME to ISW GW | Create Session Response | Multi-connection policy | Indicate preferred access for downlink packets in case of multi-connection | |

Integrated Small-Cell an WiFi (ISW) Processing

The systems described above in connection with FIGS. 4-7 are adapted to provide inter-system mobility in integrated WLAN and HeNB/LTE networks. The disclosed example embodiments comprise an ISW GW 290 that provides both control plane and user plane for both HeNB 230 and WLAN 212 access to the PDN of the EPC 214. A new interface "S1a" 292 supports both control plane and user plane communications between the TWAN 212 and the ISW GW 290. The ISW GW 290 interfaces with the MME 234 over SW-MME' control plane interface 235, and communicates with SGW 238 over S1-U' user plane interface 237. Control plane interface SW-MME' 235 operates substantially as prior SW-MME interfaces, but has been extended to accommodate control plane processing for both WLAN and HENB/LTE access. User plane interface S1-U' 237 operates substantially as prior S1-U interfaces, but has been extended to process GTP-U data related to both the HeNB and WLAN access.

Figure 8:
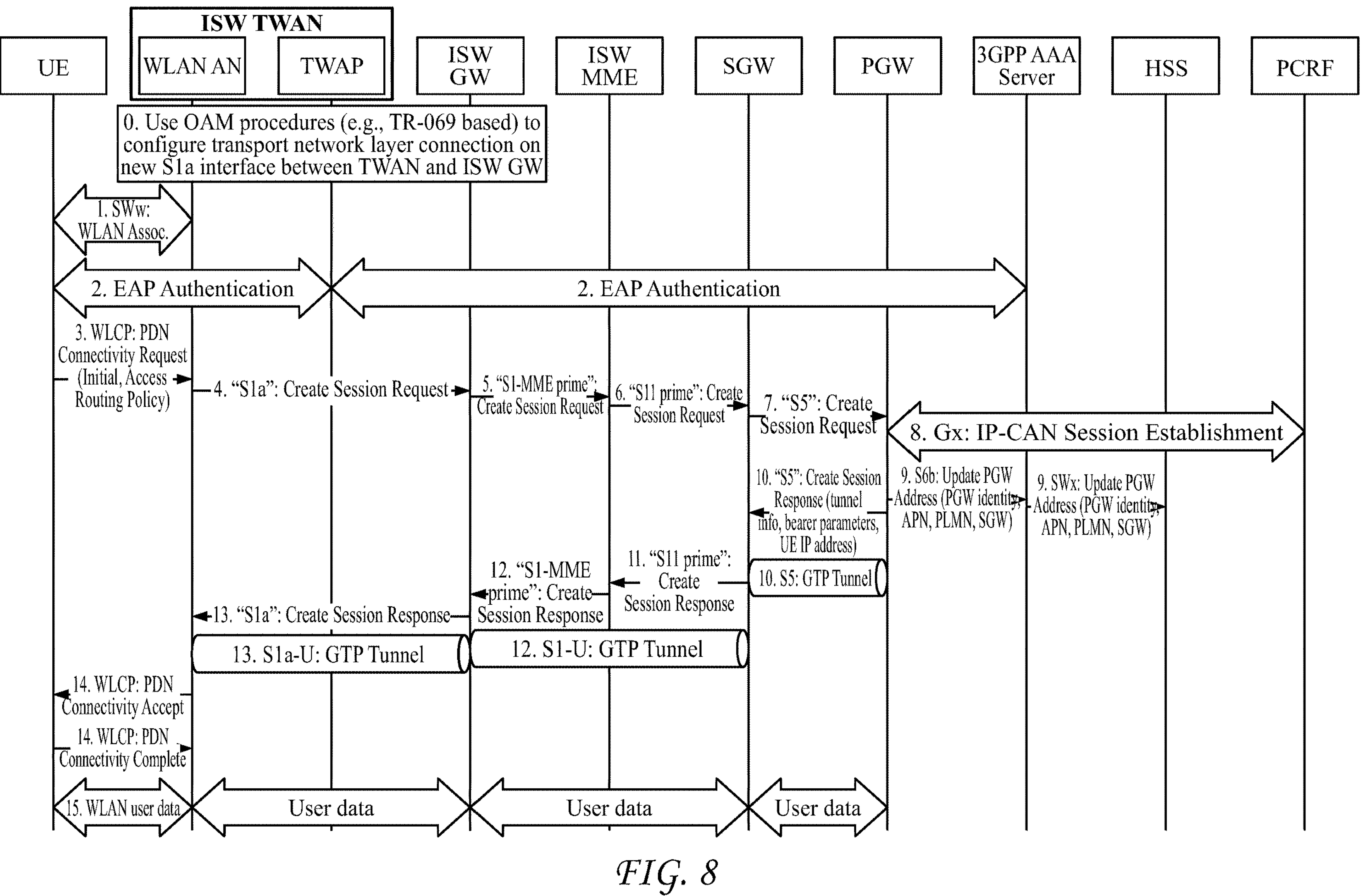
FIG. 8 is a diagram depicting example processing associated with a UE attaching via a TWAN to a PDN.

FIGS. 8-12 depict flow diagrams for example processing performed by an example system such as described above in connection with FIGS. 4-7. More particularly, FIG. 8 depicts processing relating to the ISW GW 290 and integrated MME 234 and SGW 238 providing user equipment (UE) 262 with access to the capabilities of a packet data network (PDN) through either the HeNB/LTE access network 230 or TWAN 212. FIGS. 9 and 11 depict flow diagrams for processing associated with an existing communication connection between a UE 262 and a PDN 222 being handed over from one of the HeNB/LTE access network 230 or TWAN 212 to the other. FIGS. 10 and 12, depict flow diagrams for processing associated with the ISW GW 290 and integrated MME 234 and SGW 238 providing for simultaneously maintaining two communication paths, one via the HeNB/LTE access network 230 and one via the TWAN 212, between a UE 262 and a packet network 222.

TWAN Connectivity to EPC via ISW Gateway

The disclosed systems are adapted to establish a communication path to a PDN via a TWAN. The systems are also adapted to hand over a communication session initiated through the HeNB network to the TWAN. Likewise the disclosed systems are adapted to simultaneously maintain a communication path through both an HeNB network and TWAN. Processing associated with each of these is discussed below in connection with FIGS. 8-10.

Initial Connection to EPC Via ISW Gateway

Before a UE may communicate with a PDN or EPC, the UE must attach to the PDN or EPC. The disclosed systems and methods support attaching via the TWAN 212.

Generally, the attach processing involves the UE 262 connecting to the EPC 214 via Trusted WLAN 212 using the ISW GW 290. FIG. 8 is a flow diagram depicting example processing associated with the attach procedure initiated through TWAN 212. Referring to FIG. 8, at step 0, the S1a transport network layer (TNL) is established, or is confirmed to have been established between the TWAN (WLAN AN) 212 and the ISW GW 290. The TNL may be established via, for example, OAM procedures.

At step 1, the UE 262 associates to a WiFi access point (AP) 210 that is part of an operator's Trusted WLAN Access Network (TWAN) 212. In an example embodiment, association occurs consistent with standard IEEE 802.11 procedures and via the SWw interface. The UE 262 may discover and attempt to associate with this WiFi AP 210 based on pre-configured information, ANDSF policies, ANQP signaling, etc. In case the UE 262 already has an ongoing connection to a different PDN via LTE access, the added connection via WiFi may be considered an instance of MAPCON, whereby connections to multiple PDNs are maintained via simultaneous use of cellular and WiFi access. This scenario is discussed below in connection with FIGS. 10A-B.

At step 2, EAP authentication is performed using existing standard procedures via the TWAP 264 functionality in the TWAN 212. It is assumed that the EAP payload contains an indication triggering use of the WLCP protocol as per the SaMOG phase-2 solution described in TR 23.852 v12.0.0, the contents of which are hereby incorporated by reference in their entirety.

At step 3, the UE 262 requests a PDN connection based on the SaMOG phase-2 "WLAN Control Protocol" (WLCP). In an example scenario, the UE 262 may request a connection to a PDN to which it is not currently connected. The request may use a WLCP-based protocol as described above that terminates in the WLAN AN 210 function of the TWAN 212.

At step 4, the WLAN AN 210 function in the TWAN 212 translates the PDN Connection Request into a GTPv2-C based Create Session Request message which the TWAN 212 communicates to the ISW GW 290 over the newly defined S1a interface 292.

At step 5, the ISW GW 290 communicates a GTPv2-C Create Session Request message to the selected MME 234 over the extended S1-MME' interface 235.

At step 6, the MME 234 generates and transmits a GTPv2-C Create Session Request message to the SGW 238 over the extended S11' ("prime") interface. In an example embodiment, the message includes APN, IMSI, RAT type (e.g., ISW-WLAN), BSSID, SSID, etc.

At step 7, the SGW 238 generates and transmits a GTPv2-C Create Session Request message to the selected PGW 222 over the S5 interface. In an example scenario, the message may include an indication that the RAT type is ISW-WLAN.

At step 8, in the scenario where dynamic policy and charging control (PCC) is implemented, the PGW 222 communicates the session establishment to the Policy and Charging Rules Function (PCRF) in order to retrieve the QoS and charging rules. Thereafter, the PGW 222 may enforce the retrieved rules. In the scenario dynamic PCC is not implemented, the rules may be pre-configured in the PGW 222. When the PGW 222 communicates the session establishment to the PCRF, it may communicate that the RAT type is ISW-WLAN.

At step 9, the PGW 222 uses the S6b interface to update the 3GPP AAA Server 218 with the associated PGW connectivity information for the UE 262. In addition, it also provides the associated SGW 238 information. The 3GPP AAA Server 218 subsequently updates the Home Subscriber System (HSS) 270 with the received information via the SWx interface.

At step 10, the PGW 222 communicates the GTPv2-C Create Session Response message to the SGW 238 over the S5 interface. The communication may comprise GTP tunnel information, bearer parameters and the allocated UE IP address. As a result of the communication a GTP tunnel is established between the PGW 222 and SGW 238.

At step 11, the SGW 238 communicates the GTPv2-C Create Session Response message to the MME 234 over the extended S11' ("prime") interface.

At step 12, the MME 234 communicates the GTPv2-C Create Session Response message to the ISW GW 290 over the extended S1-MME' interface. The message may comprise, for example GTP tunnel information, bearer parameters, and the allocated UE IP address.

At step 13, the ISW GW 290 communicates the GTPv2-C Create Session Response message to the WLAN AN 210 over the newly defined S1a interface 292. The message provides notice that the requested PDN connection has been successfully established.

At step 14, the WLAN AN 210 communicates the successful establishment of a PDN Connection to the UE 262 via the WLCP-based protocol over the SWw interface.

At step 15, if the UE 262 did not receive its IPv4 address in the previous step, it may receive the IPv4 address from the WLAN AN via DHCPv4. Thereafter, the WLAN AN 210 may route packets between the UE 262 and PGW 222 via the ISW GW 290 and the SGW 238.

Intra ISW GW Handover from HeNB to Trusted WLAN

In some instances, it may be desired for a UE that has an existing communication path to a PDN via an HeNB connection, to handover the data flow from the existing communication path to a new connection path via a TWAN connection. The process of switching the connection path may be referred to as a "handover." In an example scenario, the UE 262 initiates a TWAN 212 attachment in order to establish a connection with a PDN to which the UE 262 is already connected to via HeNB 230. It is assumed that there are no other existing connections to this PDN via the TWAN 212 and that the TWAN 212 is connected to EPC 214 via the same ISW GW 290 used for the HeNB connection. Once the TWAN 212 connection is established, the UE 262 releases the associated HeNB 230 connection, thereby completing a handover from the HeNB 230 to the TWAN 212. In an example embodiment, using the intra ISW GW 290 optimizations as disclosed herein, the existing GTP tunnels towards SGW 238 and PGW 222 are re-used for communication via the TWAN 212.

Figure 9A:
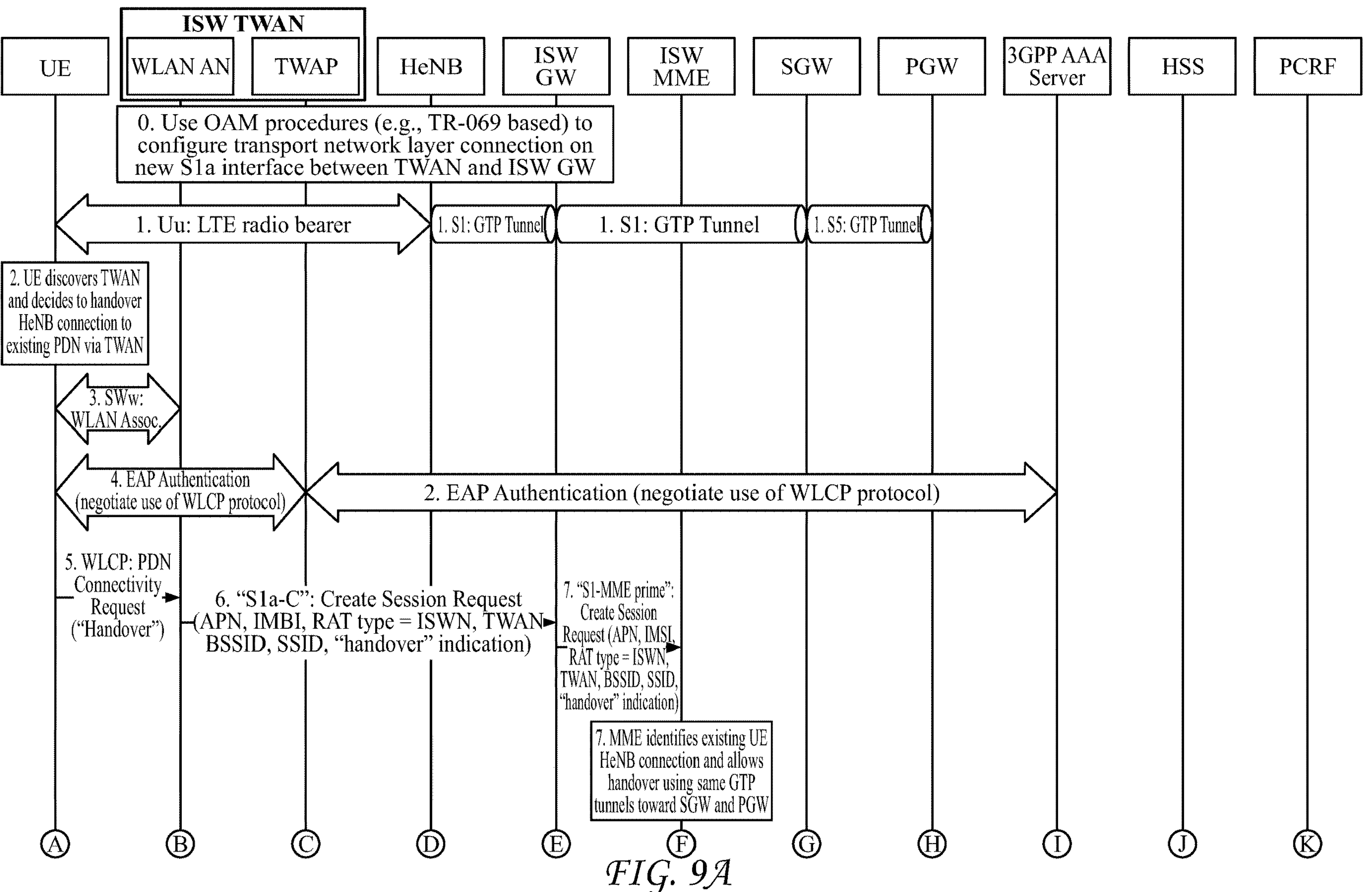
FIGS. 9A-B present a diagram depicting example processing associated with an intra ISW-GW handover from an HeNB/LTE network to a TWAN.
Figure 9B:
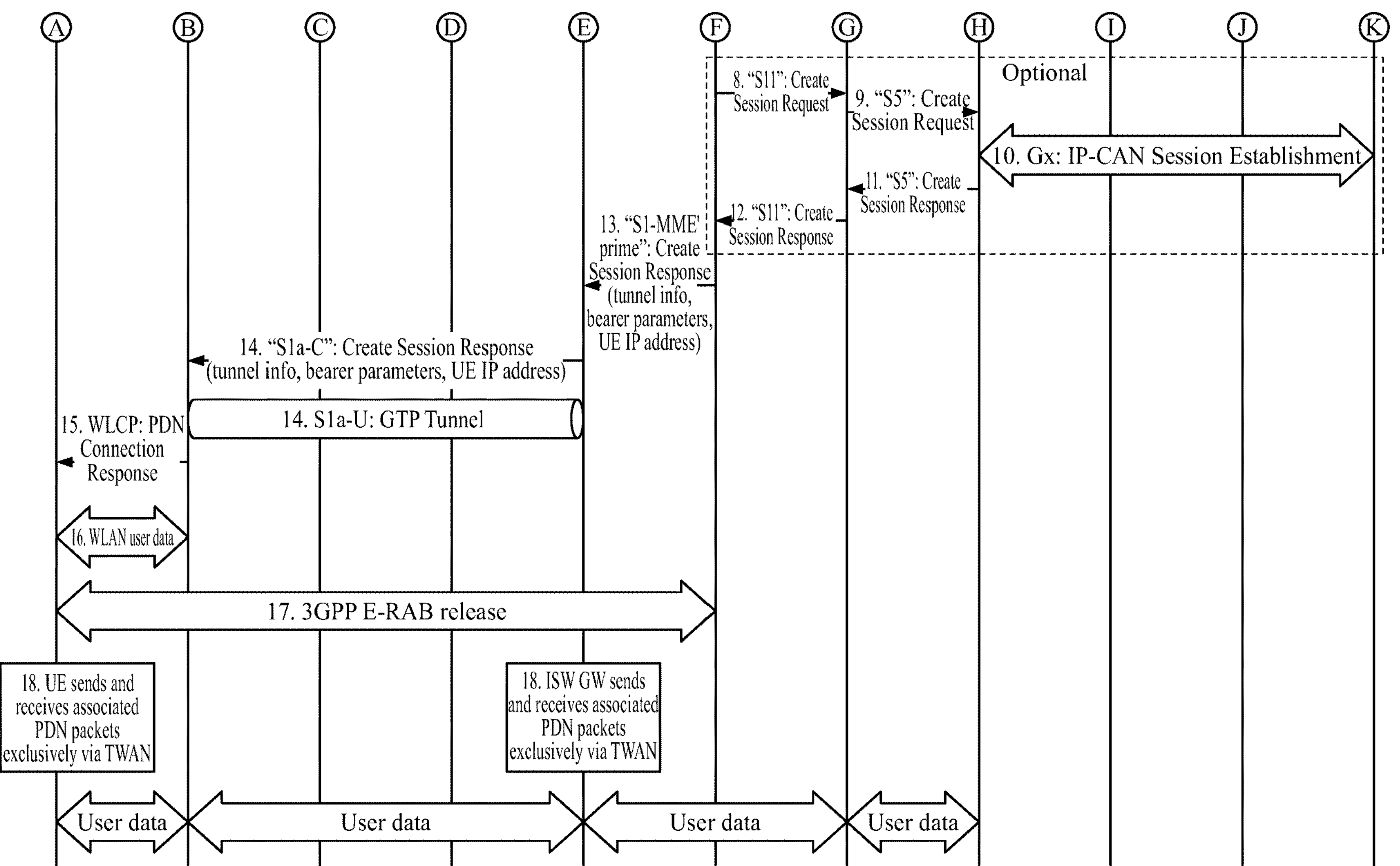

FIGS. 9A-B present a flow diagram depicting example processing associated with performing a handover from an existing HeNB 230 connection to Trusted WLAN 212 connection.

At step 0, shown on FIG. 9A, an S1a transport network layer (TNL) connection is established, or confirmed to have been established between the TWAN (WLAN) 212 and the ISW GW 290. In an example embodiment, the connection may be established using, for example, OAM procedures.

At step 1, in an example scenario, the UE 262 is already using HeNB 230 access to a PDN through the SGW 238 and PGW 222 via an ISW GW 290. In an example embodiment, the connection consists of a concatenation of the following: 1) an LTE radio bearer over the Uu interface between the UE 262 and HeNB 230; 2) a GTP tunnel over the S1 interface between the HeNB 230 and ISW GW 290, 3) a GTP tunnel over the S1 interface between the ISW GW 290 and SGW 238, and 4) a GTP tunnel over the S5 interface between the SGW 238 and PGW 222. In this example scenario, the ISW GW 290 provides the standard functionality of an HeNB GW.

At step 2, the UE 262 discovers a WiFi AP 210 that is part of the operator's TWAN 212 and selects to handover an existing PDN connection from the HeNB 230 to the TWAN 212. The UE 262 may discover and attempt association with this WiFi AP 210 based on any suitable information including, for example, pre-configured information, ANDSF policies, ANQP signaling, etc.

At step 3, the UE 262 associates to the WiFi access point (AP) 210 using standard IEEE 802.11 procedures over the SWw interface.

At step 4, EAP authentication is performed using existing standard procedures via the TWAP 264 functionality of the TWAN 212. In an example embodiment, the EAP payload contains information triggering use of the WLCP-based protocol as per the SaMOG phase-2 solution described in TR 23.852 v12.0.0 the contents of which are hereby incorporated by reference.

At step 5, the UE 262 requests a PDN Connection based on the SaMOG phase-2 "WLAN Control Protocol (WLCP). This request comprises information indicating a "handover" is requested, as well as the access point name (APN) for the current PDN connection existing over the HeNB.

At step 6, the WLAN AN 210 function in the TWAN 212 translates the PDN Connection Request into a GTPv2-C based Create Session Request message and communicates the message to the ISW GW 290 over the newly proposed S1a interface 292. In an example scenario, the message may comprise APN, IMSI, RAT type (e.g., ISW-WLAN), BSSID, SSID, etc.), along with the "handover" indication.

At step 7, shown in FIG. 9A, the ISW GW 290 communicates a GTPv2-C Create Session Request message to the MME 234 over the extended S1-MME' interface 235. In an example scenario, the message may comprise APN, IMSI, RAT type (e.g., ISW-WLAN), BSSID, SSID, etc.), along with the "handover" indication.

Referring to FIG. 9B, steps 8-12 operate to inform other network elements of the inter-system events. This notification processing may be useful in connection with, for example, charging the appropriate party for the data communicated over the connection.

At step 8, the MME 234 generates and transmits a GTPv2-C Create Session Request message to the SGW 238 over the extended S11' ("prime") interface. The same SGW 238 as is being used for the existing PDN connection is used to implement the handover. In an example scenario, the message may comprise the APN, the IMSI, a RAT type (e.g., ISW-WLAN, BSSID, SSID, etc.), and an indication the request relates to a "handover."

At step 9, the SGW 238 communicates a Create Session Request message with a "Handover" Indication for the existing APN to the PGW 222. The same PGW 222 as is being used for the existing PDN connection is used to implement the handover. When the PGW 222 sees the Create Session Request message with the "Handover" indication, the PGW 222 uses the existing GTP tunnel rather than create a new one with the SGW 238. The Create Session Request message prompts the PGW 222 to notify the PCRF of the change in access network such that the appropriate policy and charging takes place.

It will be appreciated that the Create Session Request message communicated to the PGW 222 may be optional because the PGW 222 does not necessarily need to be told about the change in access network. In an alternative embodiment, the change in access network could be noted in the SGW's 238 charging records. The SGW's 238 and PGW's 222 charging records could later be reconciled in the billing system.

In still another embodiment, the SGW 238 could directly notify the PCRF 294 of the change of access network via a new interface between the SGW 238 and PCRF 294. In this scenario, the PCRF could update the PGW if necessary.

Referring again to FIG. 9B, at step 10, if dynamic policy and charging control (PCC) is implemented, the PGW 222 communicates the session establishment to the Policy and Charging Rules Function (PCRF) 294 in order to retrieve the QoS and charging rules. Since the "Handover" Indication is included, the PGW 222 executes a PCEF-initiated IP-CAN Session Modification Procedure with the PCRF 294 to obtain the policy and charging rules to be enforced. The PGW 222 may then enforce these rules. If dynamic PCC is not implemented, such rules may be pre-configured in the PGW 222.

At step 11, the PGW 222 communicates the GTPv2-C Create Session Response message to the SGW 238 over the S5 interface. The message may comprise, for example, GTP tunnel information, bearer parameters, and the allocated UE IP address. In an example embodiment, the message comprises the IP address that was previously allocated for the UE 262.

At step 12, the SGW 238 communicates the GTPv2-C Create Session Response message to the MME 234 over the extended S11' interface. The message comprises GTP tunnel information, bearer parameters, and the previously allocated IP address for the UE 262.

At step 13, the MME 234 communicates the GTPv2-C Create Session Response message to the ISW GW over the extended S1-MME' interface 235. The message comprises GTP tunnel information, bearer parameters, and the previously allocated IP address for the UE.

At step 14, the ISW GW 290 communicates the GTPv2-C Create Session Response message to the WLAN AN 210 over the newly proposed S1a interface 292. The message comprises GTP tunnel information, bearer parameters, and the previously allocated IP address for the UE. With the completion of this step, the GTP tunnel between the ISW-GW 290 and WLAN AN 210 is established.

At step 15, the WLAN AN 210 communicates the successful PDN Connection establishment to the UE 262 via the WLCP-based protocol over the SWw interface. In an example embodiment, the communication comprises the previously allocated UE IP address.

At step 16, the WLAN AN 210 is able to route packets between the UE 262 and PGW 222 via the ISW GW 290 and SGW 238.

At step 17, the UE 262 initiates release of the radio bearers between UE 262 and HeNB 230.

At step 18, the UE 262 and ISW GW 290 send and receive associated PDN packets exclusively via the WLAN AN 210 in the TWAN 212.

Intra ISW GW Multi-Connection Via TWAN with Existing HeNB

In some instances, it may be desired for a UE 262 that has an existing communication path to a PDN 222 via an HeNB 230 connection, to add another communication path to the PDN via a TWAN 212 connection. The process of adding a connection to an existing communication path may be referred to as a generating a "multi-connection."

In an example scenario, a multi-connection may be established when a UE 262 attaches via the TWAN 21 to establish a PDN connection via an ISW GW 290 to which it is already connected via the HeNB 230. Once the TWAN 212 connection is established, the UE 262 maintains both connections and assigns transmission of specific uplink IP traffic flows to either the TWAN 212 or HeNB 230 depending on locally stored policies, signal conditions, etc. Although the access can change on a packet-by-packet basis, it is expected that a specific access selection will be used for a stable period of time as long as conditions allow.

With respect to the control plane, the MME 234 provides traffic routing policies to the ISW GW 290. In the user plane, the ISW GW 290 keeps track of the access for received uplink IP packets and, based on policy, may transmit the associated downlink packets via the same path. The policies that are used to determine which connection to employ may indicate a selection based upon, for example, a corresponding 5-tuple of source IP address, a source port number, destination IP address, a destination port number, and/or a transport layer protocol such as, for example, TCP, UDP, etc. In an alternative embodiment, in the absence of MME-provided policies, the ISW GW 290 may select a communication path based upon its own criteria such as, for example, load balance between communication paths.

Traffic routing policies may be set according to network-related criteria, UE-related criteria, or both. For example in network-related policies, the MME 234 may decide to favor the air interface that has lower utilization ratio compared to the other one. By doing so, it achieves a load-balancing objective. On the other hand in UE-related policies, the MME 234 may determine to utilize a particular air interface that achieves a targeted user quality of service (QoS).

Figure 10A:
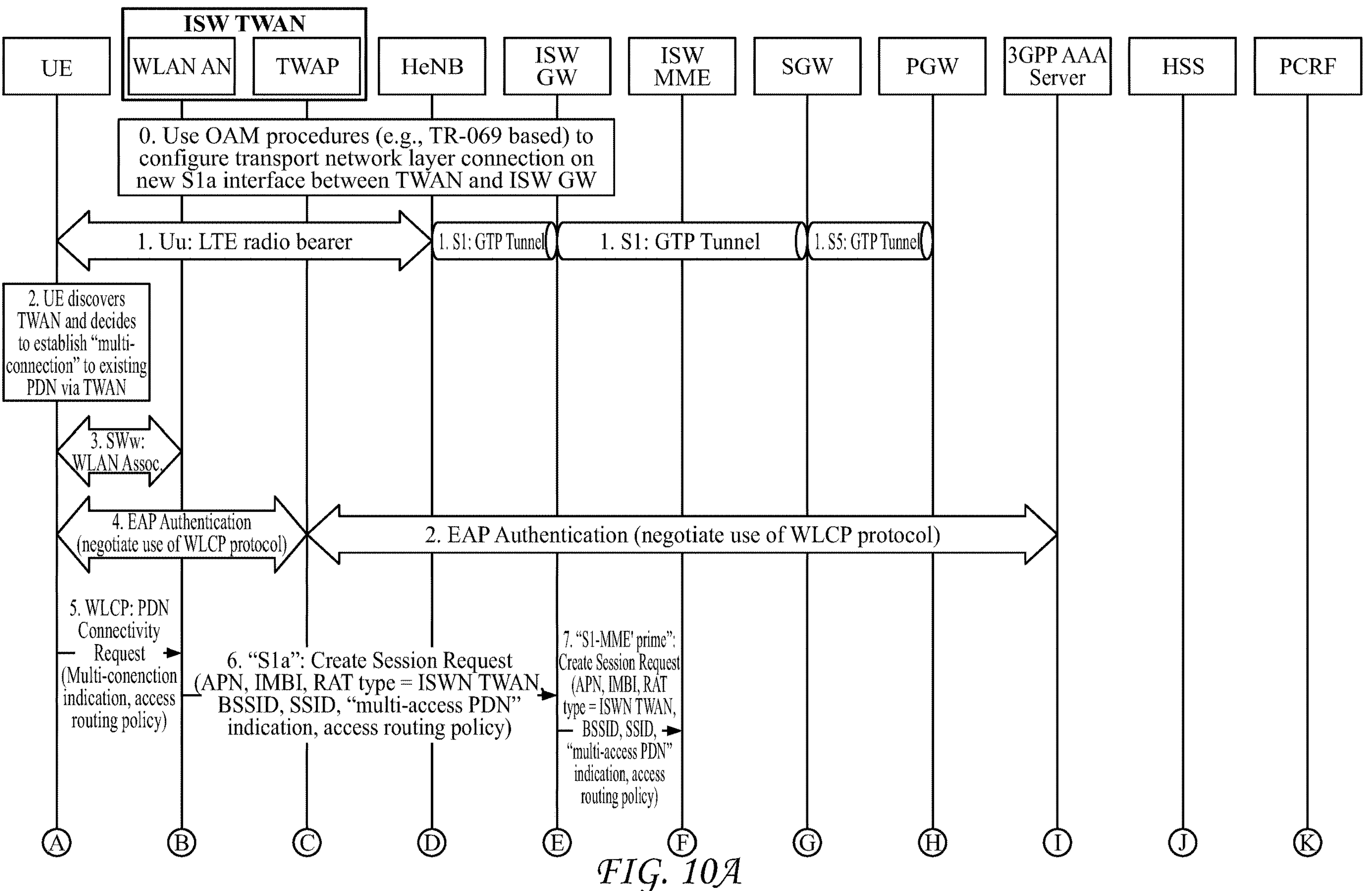
FIGS. 10A-B present a diagram depicting example processing associated with intra ISW-GW establishing multi-connection communication with a PDN via a TWAN.
Figure 10B:
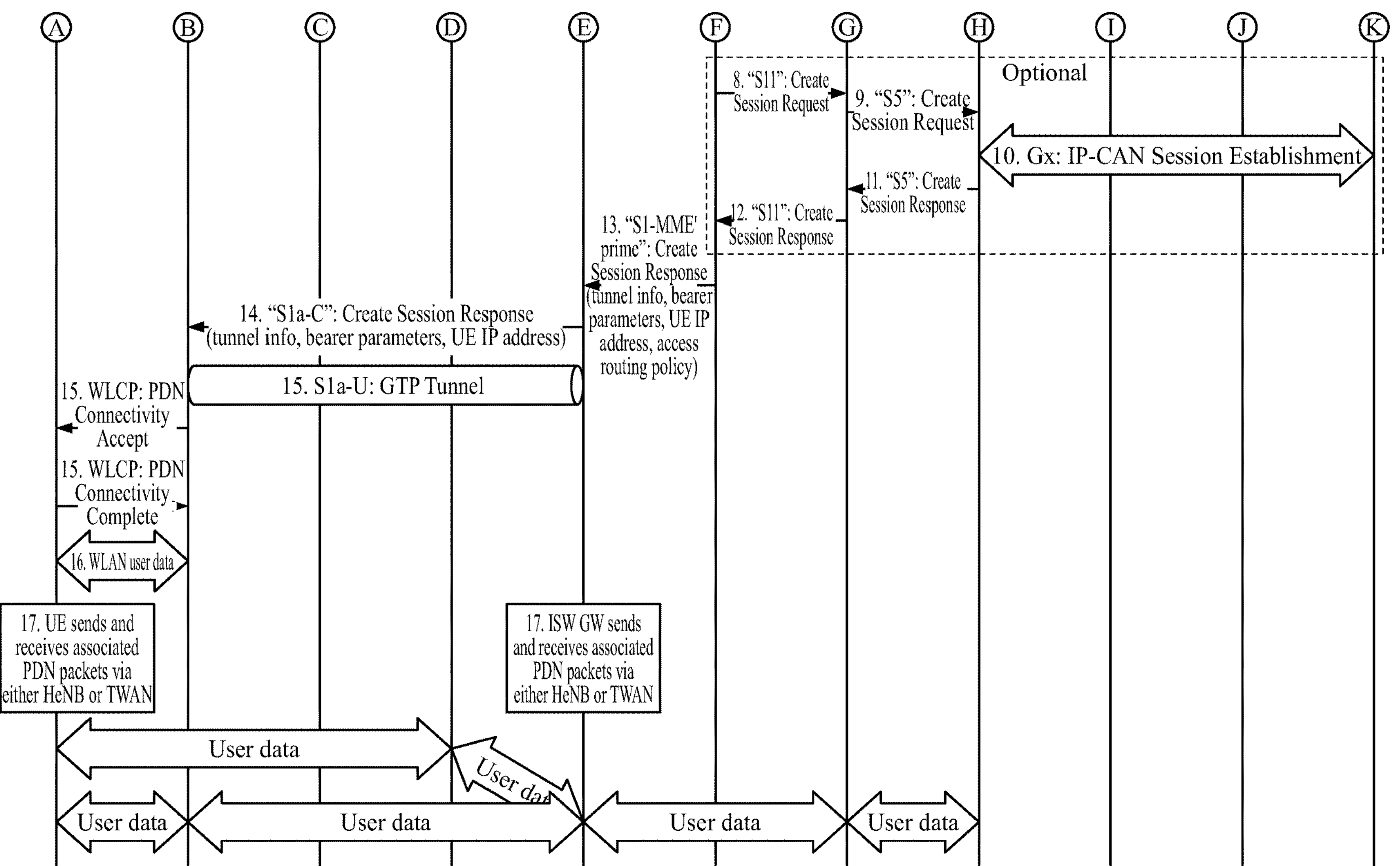

FIGS. 10A-B present a flow diagram depicting example processing associated with creating a multi-connection between a UE 262 and PDN 22 by adding a TWAN 212 connection to an existing HeNB 230 connection.

Referring to FIG. 10A, as illustrated at step 0, the S1a transport network layer (TNL) connection is established, or confirmed to have been established between TWAN (WLAN AN) 212 and ISW GW 290. The connection may be established, for example, using OAM procedures.

At step 1, the UE's connection using HeNB access to a specific PDN via an ISW GW is established. In an example scenario, the connection comprises a concatenation of the following: 1) an LTE radio bearer over the Uu interface between the UE 262 and the HeNB 230; 2) a GTP tunnel over the S1-U interface between the HeNB 230 and the ISW GW 290; 3) a GTP-U tunnel over the S1-U interface between ISW GW 290 and the SGW 238; and 4) a GTP tunnel over the S5 interface between the SGW 238 and PGW 222.

At step 2, the UE 262 discovers a WiFi AP belonging to the operator's TWAN 212 and selects to establish a multi-access connection to the existing PDN 222. The UE 262 may discover and attempt to associate with this WiFi AP 210 in any suitable manner including, for example, using pre-configured information, ANDSF policies, ANQP signaling, etc. In one example scenario, the UE 262 may determine to initiate the multi-access PDN connection based on local policies and conditions such as, for example, signal strength, perceived congestion, battery power, etc.

At step 3, the UE 262 associates to a WiFi access point (AP) 210 that is part of the operator's Trusted WLAN Access Network (TWAN) 212. In an example scenario, the association occurs via standard IEEE 802.11 procedures via the SWw interface.

At step 4, EAP authentication is performed using existing standard procedures. In an example embodiment, the EAP payload comprises an indication triggering the use of the WLCP-based protocol as per the SaMOG phase 2 solution described in TR 23.852 v12.0.0, the contents of which are hereby incorporated herein by reference in their entirety.

At step 5, the UE 262 requests a PDN connection based on the SaMOG phase-2 "WLAN Control Protocol (WLCP). In an example scenario, the UE 262 includes in the request the APN for the particular PDN accessed via the existing HeNB/LTE connection. The request may further comprise a "Multi-connection" indicator which may be used by the EPC 214 in order to assign the same IP address for the UE 262 access to the PDN 222 through the TWAN 212 as is currently being used for the access through the HeNB 230.

At step 6, the WLAN AN 210 function in the TWAN 212 translates the PDN Connection Request into a GTPv2-C based Create Session Request message and communicates the message to the ISW GW 290 over the newly defined S1a interface 292. In an example embodiment, the message may comprise an APN, an IMSI, and a RAT type (e.g., ISW-WLAN, BSSID, SSID, etc.). The request may further comprise information indicating the request is to establish "multi-connection" along with an access routing policy.

At step 7, which is shown in FIG. 10A, the ISW GW 290 generates and transmits a GTPv2-C based Create Session Request message to the MME 234 over the extended S1-MME' interface 235. In an example embodiment, the message may comprise an APN, an IMSI, and a RAT type (e.g., ISW-WLAN, BSSID, SSID, etc.). The request may further comprise information indicating the request is to establish "multi-connection" along with an access routing policy.

Referring to FIG. 10B, steps 8-12 operate to inform other network elements of the inter-system events. This notification processing may be useful in connection with, for example, charging the appropriate party for the data communicated over the connection.

At step 8, the MME 234 communicates a GTPv2-C based Create Session Request message to the SGW 238 over the extended S11' ("prime") interface. The same SGW 238 as is being used for the existing PDN connection is used to implement the multi-connection. In an example scenario, the message comprises the APN, the IMSI, a RAT type (e.g., ISW-WLAN, BSSID, SSID, etc.), and an indication the request relates to a "multi-connection."

At step 9, the SGW 238 communicates a Create Session Request with a "Multi-connection" indication for the existing APN to the PGW 222. The same PGW 222 as is being used for the existing PDN connection is used to implement forming the multi-connection. When the PGW 222 identifies the Create Session Request message with the "Multi-connection" indication, the PGW 222 uses the existing SGW GTP tunnel rather than create a new one with the SGW. The Create Session Request message prompts the PGW 222 to notify the PCRF 294 of the additional TWAN access such that the appropriate policy and charging takes place.

It will be appreciated that communicating the Create Session Request message may be optional because the PGW 222 does not necessarily need to receive an indication about the change in access network. In an alternative embodiment, the SGW 238 may directly notify the PCRF 294 of the change of access network via a new interface between the SGW 238 and PCRF 294. In this scenario, the PCRF 294 could update the PGW 222 if necessary.

At step 10, if dynamic policy and charging control (PCC) is implemented, the PGW 222 communicates the TWAN 212 session establishment to the Policy and Charging Rules Function (PCRF) 294 in order to retrieve the QoS and charging rules. Since the "Multi-connection" indication is included, the PGW 222 executes a PCEF-initiated IP-CAN Session Modification Procedure with the PCRF 294 to obtain the policy and charging rules to be enforced. The PGW 222 may then enforce these rules. If dynamic PCC is not implemented, such rules may be pre-configured in the PGW 222.

At step 11, the PGW 222 communicates the GTPv2-C Create Session Response message to the SGW 238 over the S5 interface. The message may comprise, for example, GTP tunnel information, bearer parameters, and the allocated UE IP address. The message further comprises the IP address that was previously allocated for the UE.

At step 12, the SGW 238 communicates the GTPv2-C based Create Session Response message to the MME 234 over the extended S11' interface. The message comprises GTP tunnel information, bearer parameters, and the previously allocated IP address for the UE.

At step 13, the MME 234 communicates the GTPv2-C based Create Session Response message to the ISW GW 290 over the extended S1-MME' interface 235. The message comprises GTP tunnel information, bearer parameters, and the previously allocated IP address for the UE 262. In an example embodiment, the message may further comprise a multi-connection access routing policy which may be used by the ISW GW 290 in selecting to route data over either the TWAN or HeNB connections.

At step 14, the ISW GW 290 communicates the GTPv2-C based Create Session Response message to the WLAN AN 210 function in the TWAN 212 over the newly proposed S1a interface 292. The message comprises GTP tunnel information, bearer parameters, and the previously allocated IP address for the UE 262. With the completion of this step, the GTP tunnel between the ISW GW 290 and WLAN AN 210 is established At step 15, the WLAN AN 210 communicates the successful PDN Connection establishment to the UE 262 via the WLCP based protocol over the SWw interface. In an example embodiment, the communication comprises the previously allocated UE IP address.

At step 16, the TWAN 212 is able to route packets between the UE 262 and PGW 222 via the ISW GW 290 and SGW 238.

At step 17, the UE 262 may route packets via the ISW GW 238 to the PDN 222 over either the TWAN 212 or the HeNB 230. Likewise, the ISW GW 290 may route packets to the UE 262 over either the TWAN 212 or the HeNB 230.

HeNB Connectivity to EPC Via ISW Gateway

The above discussions in connection with FIGS. 4-9 have focused primarily on connections to a PDN 222 that have been initiated via a TWAN. The disclosed systems and methods apply as well, however, to connections initiated via an HeNB/LTE access network.

Initial EPC Attachment Via HeNB Using ISW GW

In the disclosed systems and methods, an initial attach via an LTE (H)eNB access network is performed substantially as defined in existing 3GPP standards. An initial attach via (H)eNB utilizes the standard MME 234 and SGW 238 along with baseline EPC architecture and protocols. However, in the disclosed systems and methods for integrated small cell and WiFi access, one deviation from existing processing is the ability of the MME 234 to assign an ISW-enabled SGW 238 for initial LTE access. The MME 234 is made aware of this information as part of the extended information provided by the HSS 270 via the S6a interface.

UE-Initiated Intra ISW GW Handover from TWAN to HeNB

Figure 11A:
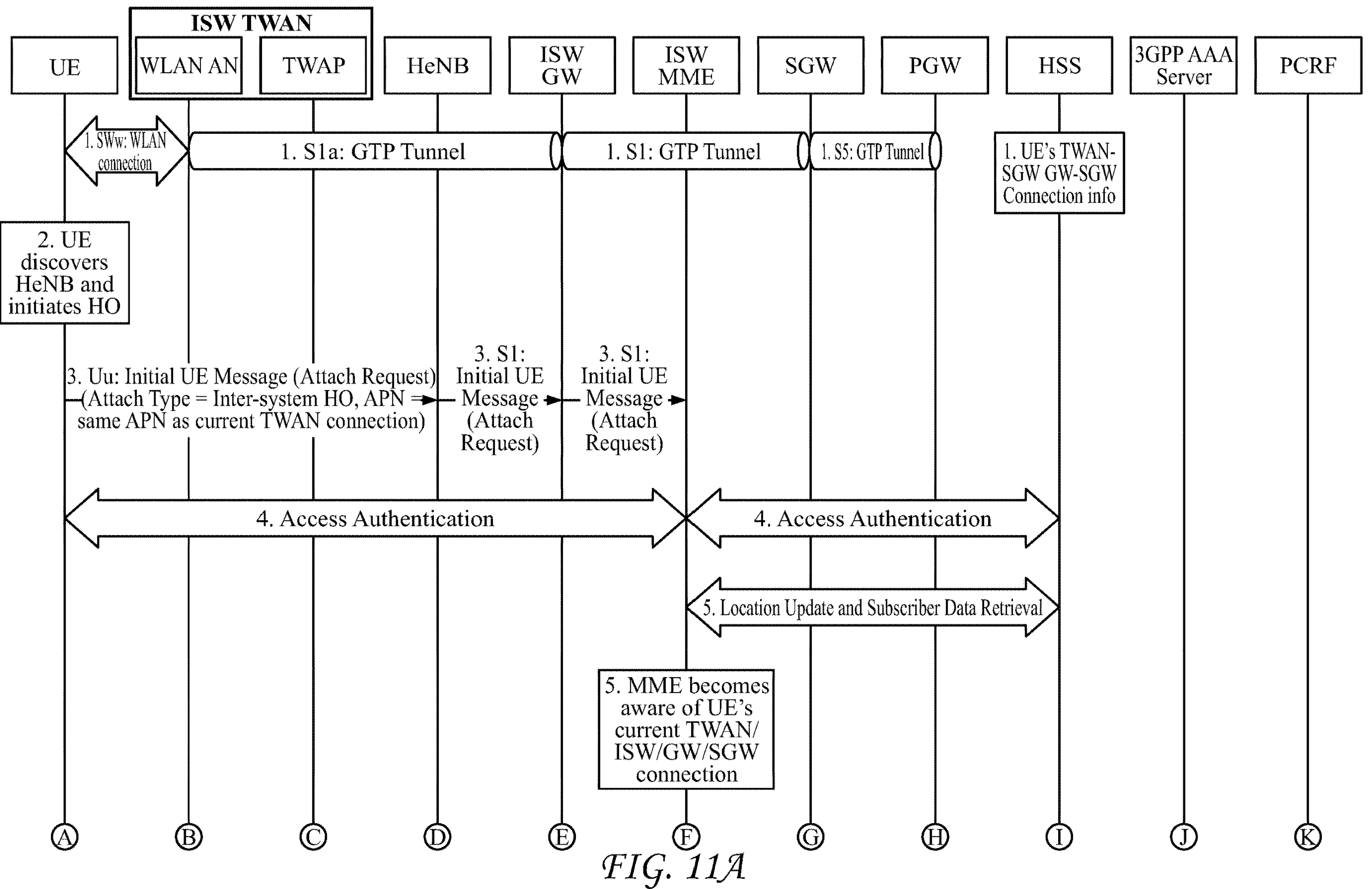
FIGS. 11A-C present a diagram of example processing associated with a UE initiated intra ISW-GW handover of a connection from a TWAN to an HeNB/LTE network.
Figure 11B:
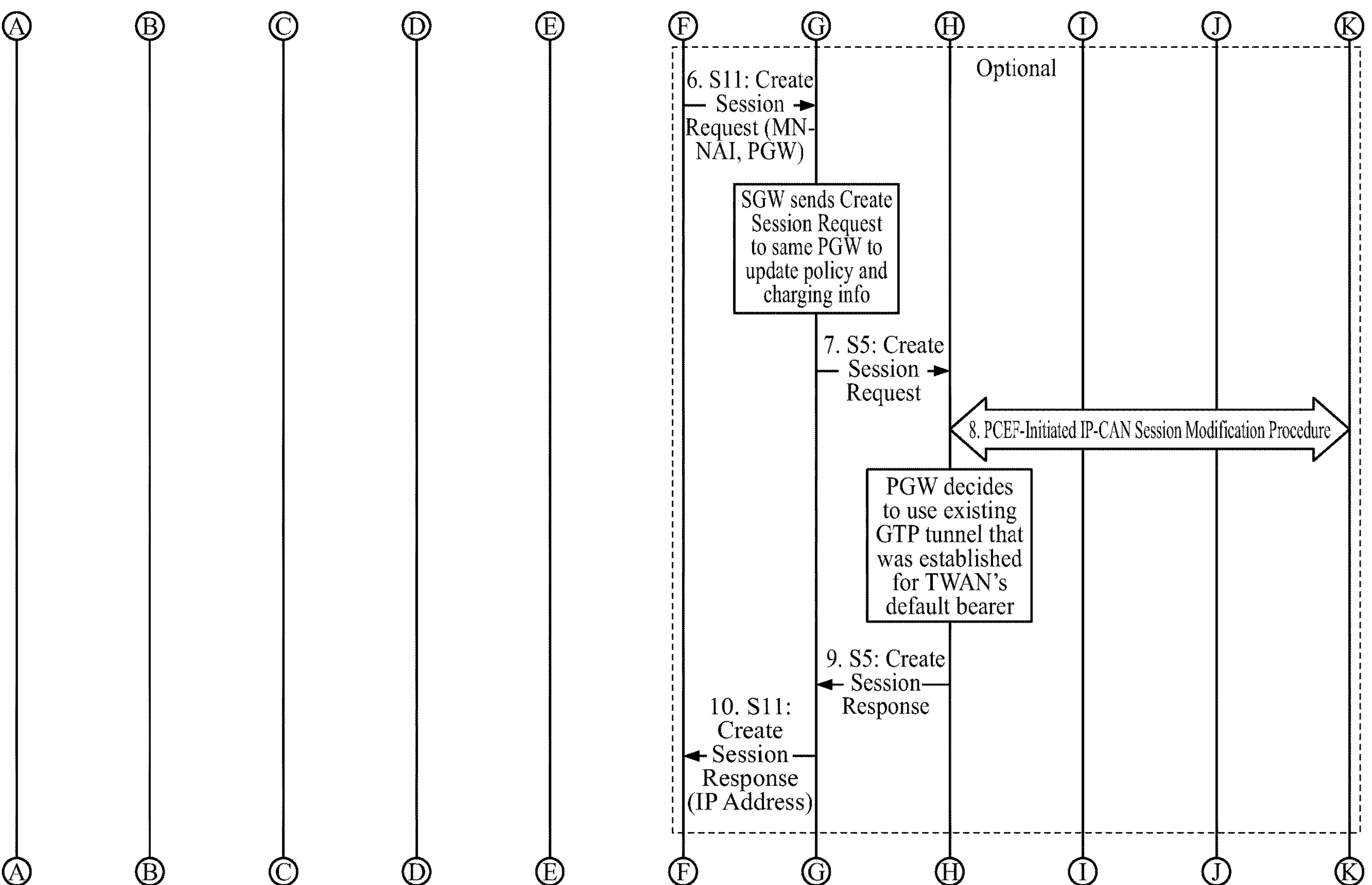
Figure 11C:
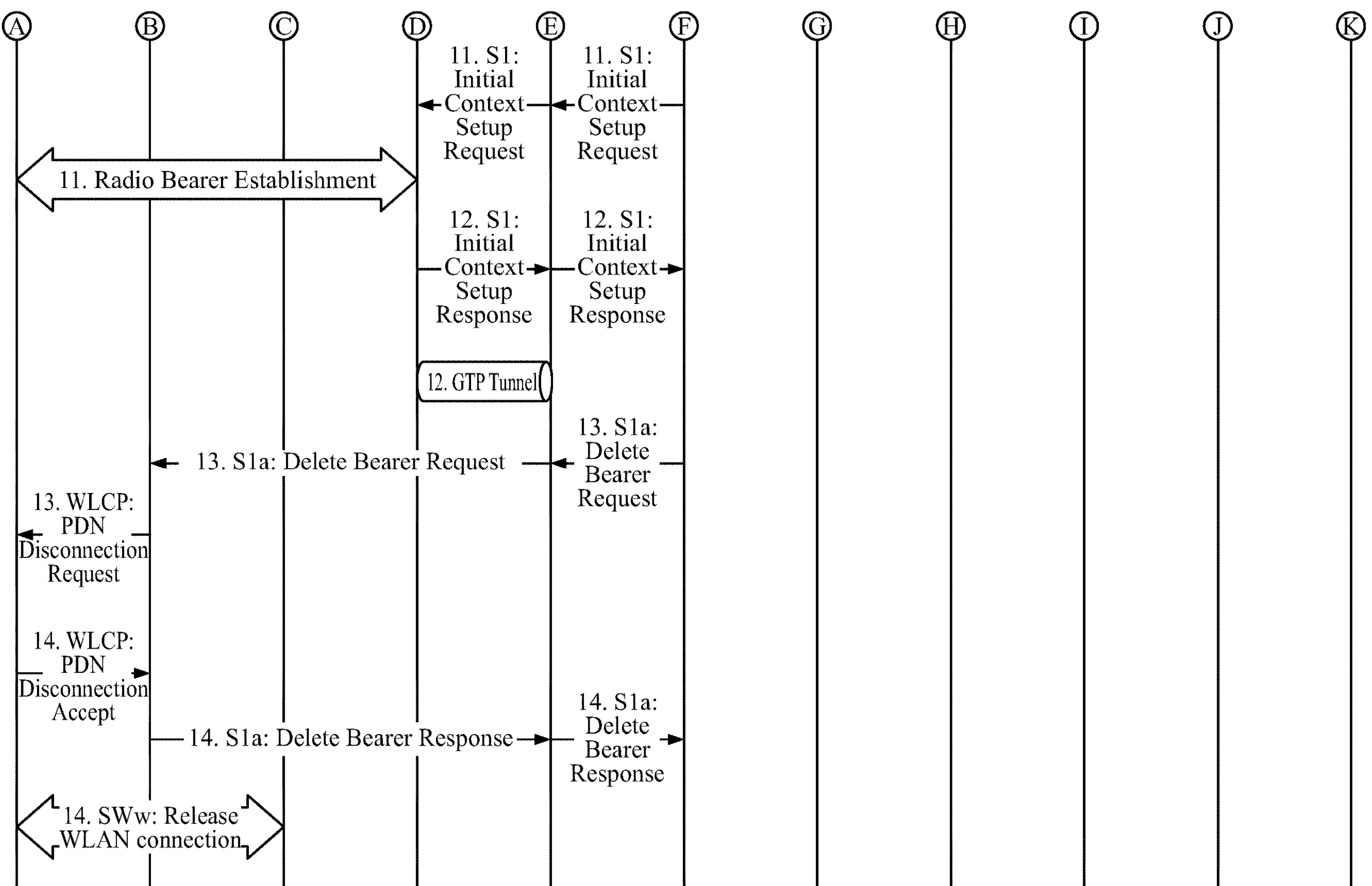

A process for intra-SGW handover from an HeNB/LTE connection to TWAN connection is described above in connection with FIG. 9. The disclosed systems and methods are likewise adapted to support handovers from a TWAN connection to an HeNB/LTE connection. FIGS. 11A-C present example processing performed in connection with a handover procedure from a TWAN connection to an LTE connection.

3GPP standards support two forms of intra-system LTE handover (e.g., handover from one eNB communication path to another eNB communication path): 1) S1-based handover; and 2) X2-based handover. In the situation where a handover is to be performed and different SGWs are serving the source and target eNBs, the required SGW "relocation" procedure is also specified. Intra-LTE handovers are typically network-initiated, and are usually based on UE measurements reported to the (H)eNBs.

With respect to inter-system LTE handover, per current 3GPP standards, inter-system handovers (e.g., handover from a TWAN connection to an eNB connection) are UE-initiated. In the systems and methods disclosed herein, the HeNB/WLAN handovers may make use of the S1a interface 292.

In an example scenario, it may be assumed that a PDN connection already exists via the concatenation of a WLAN link between the UE and the TWAN, a GTP tunnel between the TWAN and ISW GW, a GTP tunnel between the ISW GW and the SGW, and another GTP tunnel between the SGW and the PGW. In an example embodiment, the handover procedure re-uses portions of the existing tunnel (e.g., the GTP tunnels towards the SGW and PGW), while replacing the portion of the tunnel from the ISW GW to the UE with a new tunnel portion via the HeNB.

Once the HeNB connection is established, the MME releases the associated TWAN connection thereby completing a handover from TWAN to HeNB. However, based on the intra ISW GW optimizations in this disclosure, the GTP tunnels towards SGW and PGW are re-used.

FIGS. 11A-C depict a flow diagram of example processing associated with intra ISW GW handover from the TWAN 212 to the HeNB 230.

Referring to FIG. 11A, at step 1, the UE 262 uses the TWAN 212 to connect to the PGW 222 via an ISW GW 290 as described above. In an example embodiment, the connection comprises a concatenation of the following: 1) a WLAN link over the SWw interface between the UE and TWAN; 2) a GTP tunnel over the newly proposed S1a interface between the TWAN and ISW GW; 3) a GTP tunnel over the S1 interface between the ISW GW and SGW; and 4) a GTP tunnel over the S5 interface between the SGW and PGW. The UE's 262 TWAN-ISW GW-SGW connection information may be stored in HSS 270.

At step 2, the UE 262 determines or selects to transfer its current PDN 222 connection (i.e., handover) from the TWAN 212 to the HeNB 230. In an example embodiment, the UE 262 may use access network discovery and selection function (ANDSF) policies to determine the course of action.

At step 3, the UE 262 generates and communicates an Attach Request message through the HeNB 230 to the MME 234. In an example embodiment, the message comprises an attach type and an access point name (APN). The APN may be any one of possibly several APNs corresponding to the PDN 222 connections in the TWAN 212. The message may further comprise an indication the request is for a "handover." The message is routed by the HeNB 230 to the MME 234 via the ISW GW 290.

At step 4, the MME 234 contacts the HSS 270 and authenticates the UE 262.

At step 5, after successful authentication, the MME 234 performs a location update procedure and subscriber data retrieval from the HSS 270. Where the request is for a handover, the PGW 222 address conveyed to the MME 234 is stored in the MME's PDN subscription context. The MME 234 receives information for the UE's TWAN PDN connection via subscriber data obtained from the HSS 270. In an example embodiment, the HSS 270 comprises information identifying the MME 234 and SGW 238 as "ISW-enabled." Alternatively, while the UE 262 authenticated with the TWAN 212, the UE 262 may have triggered the HSS 272 to send the updated subscriber information to the MME 234.

Referring to FIG. 11B, steps 6-10 operate to inform other network elements of the inter-system events. This notification processing may be useful in connection with, for example, charging the appropriate party for the data communicated over the connection.

At step 6, the MME 234 selects an APN, SGW, and PGW. In the case the HeNB 230 can be served by the same SGW 238 as the TWAN 212, the MME 234 generates and communicates a Create Session Request (including IMSI, MME Context ID, PGW address, APN, and "Handover" indication) message to the selected SGW 238.

At step 7, the SGW 238 communicates a Create Session Request ("Handover" Indication) message to the PGW 222. In the scenario wherein an intra-SGW handover of an existing PDN 222 connection is being performed, the same PGW 222 is used. Therefore, when the PGW 222 sees the Create Session Request message with the inter-system "Handover" indication and the same APN as per the existing session with the TWAN, the PGW 238 uses the existing GTP tunnel rather than create a new one with the SGW. The message results in the PCRF 294 being notified of the change in access such that the appropriate policy and charging takes place.

At step 8, since the "Handover" indication is included, the PGW 222 executes a PCEF-initiated IP-CAN Session Modification Procedure with the PCRF 294 to obtain the policy and charging rules to be enforced.

At step 9, the PGW 222 responds with a Create Session Response message to the SGW 238. In an example embodiment, the message comprises the IP address or prefix that was assigned to the UE 262 for TWAN 212 access. The message may also comprise the charging ID that was assigned for the PDN connection through the TWAN 212.

At step 10, the SGW 238 returns a Create Session Response message to the MME 234. The message comprises, for example, the IP address of the UE.

Referring to FIG. 11C, at step 11, the MME 234 initiates access bearer establishment between the HeNB 230 and SGW 238 via the Initial Context Request through the ISW GW 290. This results in a Radio Bearer establishment between the UE 262 and HeNB 230.

At step 12, the HeNB 230 communicates the Initial Context Setup Response to the MME 234 via the ISW GW 290.

At step 13, the MME 234 initiates TWAN 212 resource allocation deactivation by communicating the Delete Bearer Request to the TWAN 212 via the ISW GW 290. The TWAN 212 utilizes the WLCP based PDN Disconnect Request message to release the UE-TWAN connection.

At step 14, the UE 262 acknowledges the release via the WLCP based PDN Disconnect Accept message to the TWAN 212 and releases the WLAN connection. The TWAN 212 indicates release of the TWAN connection by sending the Delete Bearer Response to the MME 234 via the ISW GW 290.

Intra ISW GW Multi-Connection Via HeNB with Existing TWAN

In some instances, it may be desired for a UE that has an existing communication path to a PDN via a TWAN connection, to add another communication path to the PDN via an HeNB connection. The process of adding a connection to an existing communication path may be referred to as generating a "multi-connection."

In an example scenario, a multi-connection may be established when a UE 262 attaches via the HeNB 230 to establish a connection with a PDN 222 to which it is already connected via the TWAN 212. In an example embodiment, the MME 234 assigns the same SGW 238 for the HeNB 230 connection as is being used by the UE's TWAN 212 connection. In an example scenario, HSS-based policies may be employed for handling specific IP data flows over the both connections.

In an example scenario, the ISW GW 290 is already serving the UE 262 via a TWAN 212 connection to the same PDN. Once the HeNB 230 connection is established, the UE 262 maintains both connections and assigns transmission of specific uplink IP traffic flows to either the TWAN 212 or HeNB 230 depending on locally stored policies, signal conditions, etc. Although the particular connection, i.e., TWAN or HeNB, may be changed on a packet-by-packet basis, it is expected that a specific access connection will typically be used for a stable period of time as long as conditions allow. In an example embodiment, based on policy provided by the MME 234, the ISW GW 290 keeps track of the communication path for received uplink IP packets and transmits the associated downlink packets (e.g., based on corresponding 5-tuple) via the same communication path. In another embodiment, in the absence of MME-provided policies, the ISW GW 290 may send downlink packets over either access based on its own criteria such as, for example, the load balance. The MME 234 and ISW GW 290 may have previously received the access routing policy as part of the TWAN to PDN connection procedure.

Figure 12A:
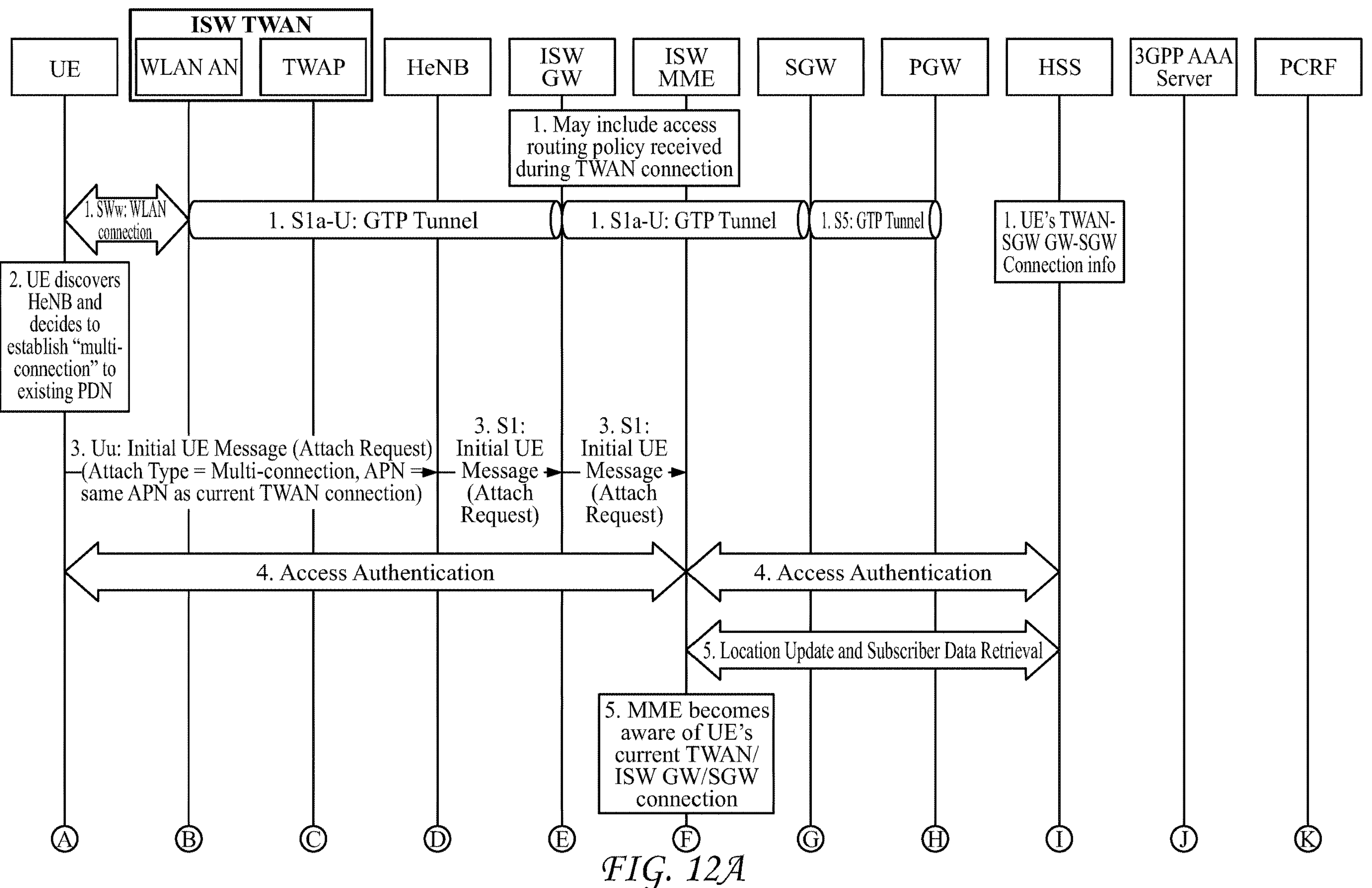
FIGS. 12A-C present a diagram depicting example processing associated with establishing intra ISW-GW multi-connection communication with a PDN via an HeNB.
Figure 12B:
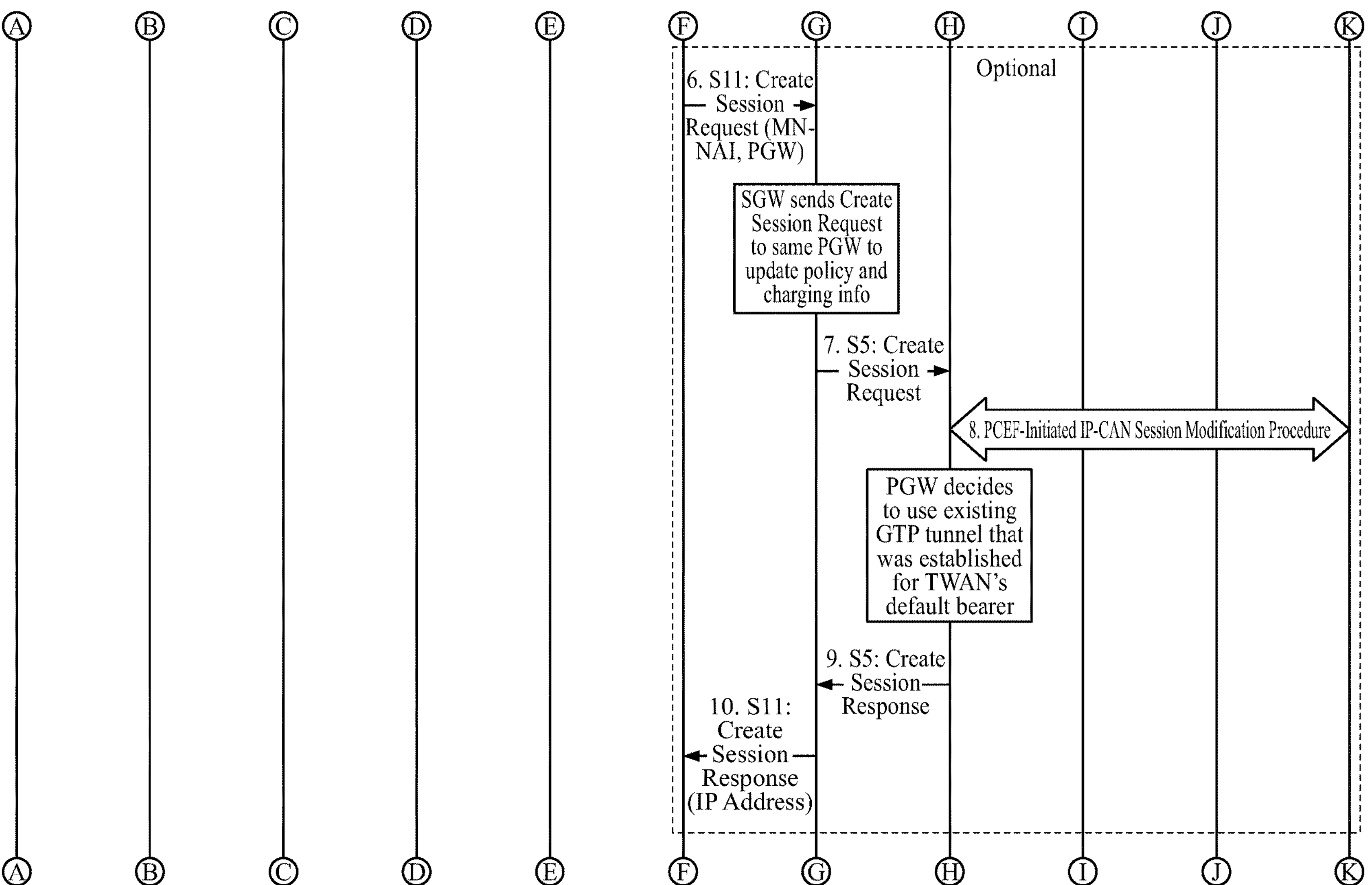
Figure 12C:
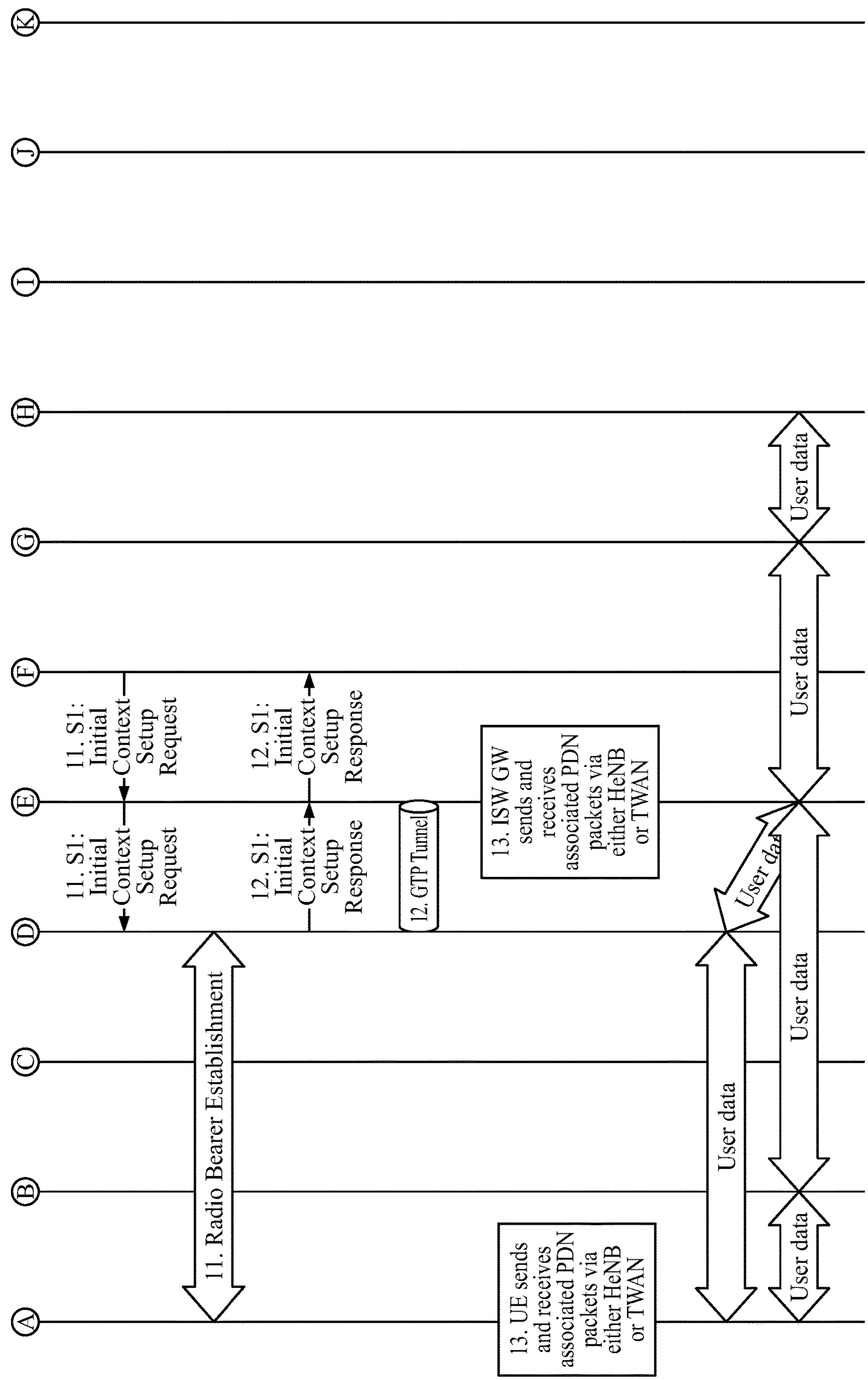

FIGS. 12A-C present a flow diagram depicting example processing associated with forming a multi-connection via both the TWAN 212 to the HeNB 230.

Referring to FIG. 12A, as shown, at step 1, the UE 262 has an established data connection to the PGW 222 via the TWAN 212 and the ISW GW 290. The connection comprises a concatenation of the following: 1) a WLAN link over the SWw interface between the UE and TWAN; 2) a GTP tunnel over the newly proposed S1a interface between the TWAN and ISW GW; 3) a GTP tunnel over the S1 interface between the ISW GW and SGW; and 4) a GTP tunnel over the S5 interface between the SGW and PGW. The UE's 262 TWAN-ISW GW-SGW connection information may be stored in HSS 270.

At step 2, the UE 262 discovers an HeNB 230 and determines or selects to establish a multi-access connection to an existing PDN 222. The UE 262 may rely upon ANDSF policies in determining to form a multi-point connection.

At step 3, the UE 262 sends an Attach Request message to the MME 234. The message may comprise, for example, an attach type and an APN. In the case of multi-access connectivity to an existing PDN 222, a new indication for "Multi-connection" attach is communicated. For "multi-connection" attach, the UE 262 includes any one of the APNs corresponding to the existing PDN connections in the TWAN 212. The message is routed by the HeNB 230 to MME 234 via the ISW GW 290.

At step 4, the MME 234 contacts the HSS 270 and authenticates the UE 262.

At step 5, after successful authentication, the MME 234 performs a location update procedure and retrieves subscriber data from the HSS 270. The PGW 222 address conveyed to the MME 234 is stored in the MME's PDN subscription context. The MME 234 receives information for the UE's TWAN PDN connection via the subscriber data that was retrieved from the HSS 270.

Referring to FIG. 12B, steps 6-10 operate to inform other network elements of the inter-system events. This notification processing may be useful in connection with, for example, charging the appropriate party for the data communicated over the connection.

At step 6, the MME 234 selects an APN, SGW, and PGW. In case the HeNB 230 can be served by the same SGW 238 as the TWAN 212, the MME 234 generates and communicates a Create Session Request (including IMSI, MME Context ID, PGW address, APN, "Multi-connection" indication) message to the selected SGW 238.

At step 7, the SGW 238 communicates a Create Session Request ("Multi-connection" Indication) message to the PGW 222. In the scenario wherein an intra ISW GW 290 multi-access connection to an existing PDN is being performed, the same PGW 222 is used. Therefore, when the PGW 222 identifies the Create Session Request message with the "Multi-connection" indication, and the same APN as per the existing session with the TWAN, the PGW 222 uses the existing GTP tunnel rather than create a new one with the SGW 238. The message results in the PCRF 294 being notified of the change in access such that the appropriate policy and charging takes place.

At step 8, since the "Multi-connection" indication is included, the PGW 222 executes a PCEF-initiated IP-CAN Session Modification Procedure with the PCRF 270 to obtain the policy and charging rules to be enforced.

At step 9, the PGW 222 responds with a Create Session Response message to the SGW 238. In an example embodiment, the message comprises the IP address or prefix that was assigned to the UE 262 for TWAN 212 access. The message may also comprise the charging ID that was assigned for the PDN connection through the TWAN 212.

At step 10, the SGW 238 returns a Create Session Response message to the MME 234. The message comprises, for example, the IP address of the UE 262.

Referring to FIG. 12C, at step 11, the MME 234 initiates access bearer establishment between the HeNB 230 and SGW 238 via the Initial Context Request through the ISW GW 290. This results in a Radio Bearer establishment between the UE 262 and the HeNB 230.

At step 12, the HeNB 230 sends the Initial Context Setup Response to the MME 234 via the ISW GW 290.

At step 13, the UE 262 routes packets via the ISW GW 290 to the PDN over either the TWAN 212 or the HeNB 230. Similarly, the ISW GW 290 routes packets to the UE 262 over either the TWAN 212 or the HeNB 230.

3GPP Interworking with Untrusted WLAN Via ISW-GW

In the example embodiments discussed above, the WLAN is described as being a trusted WLAN. It will be appreciated, however, that alterative embodiments may comprise untrusted WLANs.

Figure 13:
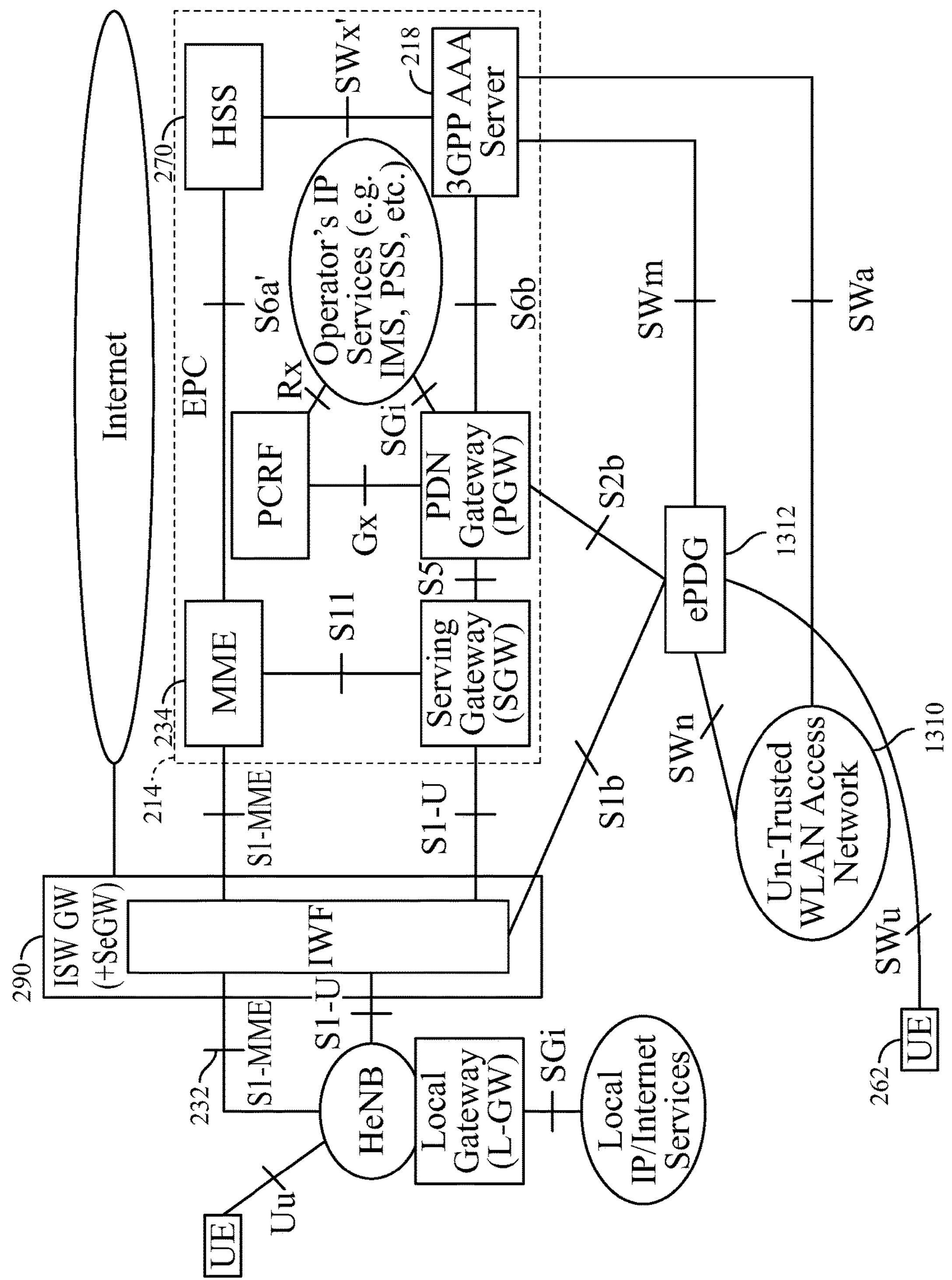
FIG. 13 depicts an example system for providing integrated HeNB/LTE and untrusted WLAN access to a PDN.

FIG. 13 depicts a network diagram of an example system embodiment comprising an untrusted WLAN 1310. As shown, the un-trusted WLAN 1310 may access the EPC 214 via the ePDG 1312 and ISW-GW 290. The ePDG 1312 operates as an intermediate entity between the un-trusted UE 262 and the PDN GW 222. The ePDG 1312 communicates with the UE 262 through an IPSec tunnel. The ePDG 1312 communicates with the PDN GW 222 over the S2b interface using GTP-U tunnel protocol.

Interface S1b is positioned between the ePDG 1312 and the ISW GW290. In an example embodiment, the control and data planes that are communicated over the S1b interface are the GTPv2-C and GTP-U protocols, respectively. With respect to the control plane, and similar to the previously proposed S1a interface, "Create Session Request/Response" messages are transferred over the S1b interface and convey the same information as described above for use at the TWAN 212 (WLAN AN 210 to ISW GW 290). With respect to the user plane, GTP tunnels are established between the ISW GW 290 and the ePDG 1312. A standard IPSec tunnel may be established between the ePDG 1312 and UE 262 using the standard IKEv2 protocol.

The chart below highlights similarities and differences between embodiments comprising trusted WLANs and embodiments comprising un-trusted WLANs. The chart illustrates similarities as between trusted and untrusted WLANs with respect to protocols, interfaces, and messages. As shown, in example embodiments, the UE authentication procedure is performed using the EAP procedure in the TWAN embodiment, while the IKEv2 procedure is used for the un-trusted WLAN embodiment. It will be appreciated that with respect to the un-trusted WLAN embodiment, the UE 262 sends EAP messages over IKEv2 to the ePDG 1312. The ePDG extracts the EAP messages received from the UE over IKEv2, and sends them to the 3GPP AAA Server 218.

As noted in the chart below, with respect to establishing UE connectivity, the WLCP protocol is used in example embodiments comprising a trusted WLAN, while the IKEv2 protocol is used to establish an IPSec tunnel between the UE and the ePDG in embodiments comprising an un-trusted WLAN.

With respect to core network connectivity, embodiments comprising trusted and un-trusted WLANs operate in a similar manner. In both instances, the S1a and S1b interfaces carry the same "Create Session Request/Response" messages and apply the same GTP-U data tunneling protocol.

| Procedure | Trusted WLAN | Untrusted WLAN |
|---|---|---|
| UE Authentication | EAP (UE-TWAN) | IKEv2 (UE-ePDG) |
| UE Connectivity Establishment | WLCP: PDN Connectivity Request/Response (UE-TWAN) | IKEv2: IPSec Tunnel Establishment (UE-ePDG) |
| Core Network Connectivity | Create Session Request/Response (TWAN-PGW) | Create Session Request/ Response (ePDG-PGW) |
| | GTP-U overS1a | GTP-U over S1b |

Figure 14:
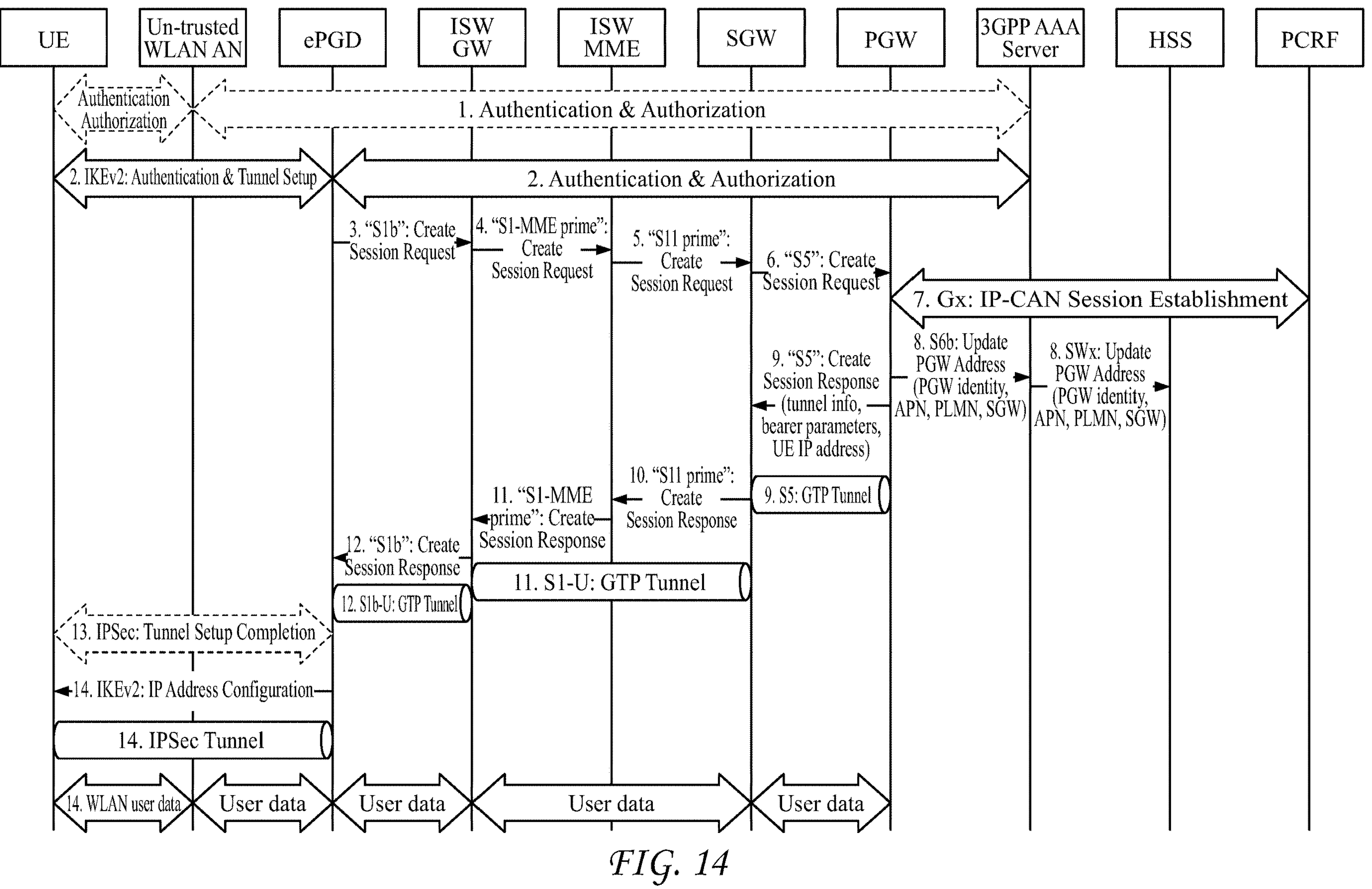
FIG. 14 is a diagram depicting example processing associated with a UE attaching via an untrusted WLAN to a PDN.

FIG. 14 is a flow diagram depicting example processing associated with establishing initial connectivity in an embodiment employing an untrusted WLAN. The processing is similar to that described above in connection with FIG. 8 relating to establishing initial connectivity where a trusted WLAN is used. Performing a handover and establishing multi-PDN connectivity can be extended in a similar fashion.

Referring to FIG. 14, at step 1, the IKEv2 access authentication procedure defined in TS 33.402, the contents of which are hereby incorporated by reference in its entirety, is used between the UE 262 and the 3GPP EPC 214.

At step 2, the UE 262 initiates the IKEv2 tunnel establishment procedure. The ePDG IP address, to which the UE needs to form an IPsec tunnel, is discovered via a DNS query as specified in clause 4.5.4 of TS 23.402, the contents of which are hereby incorporated herein by reference in its entirety. The UE 262, via IKEv2, requests connectivity to a specific PDN 222 by providing an APN. The 3GPP AAA Server 218 returns the PDN GW information to the ePDG 1312 as described in clause 4.5.1 of TS 23.402 [2].

At step 3, the ePDG 1312 initiates the session by generating and communicating a "Create Session Request" message to the ISW GW 290. Steps 3 through 12 are analogous to steps 4-13 described above in connection with FIG. 8. The processing results in the establishment of GTP-U tunnels between the PDN GW 222 and the ePDG 1312, through the S-GW 238 and to the ISW GW 290 (see Steps 9, 11, and 12).

At step 13, the ePDG 1312 communicates to the UE 262 that the authentication and authorization with the external AAA server 218 was successful.

At step 14, the ePDG 1312 generates and communicates the final IKEv2 message to the UE 262 with the IP address in IKEv2 Configuration payloads. The IPSec tunnel is now established between the UE 262 and the ePDG 1312. Furthermore, IP connectivity from the UE 262 to the PDN GW 222 has been established.

Example Computing Environment

Figure 15A:
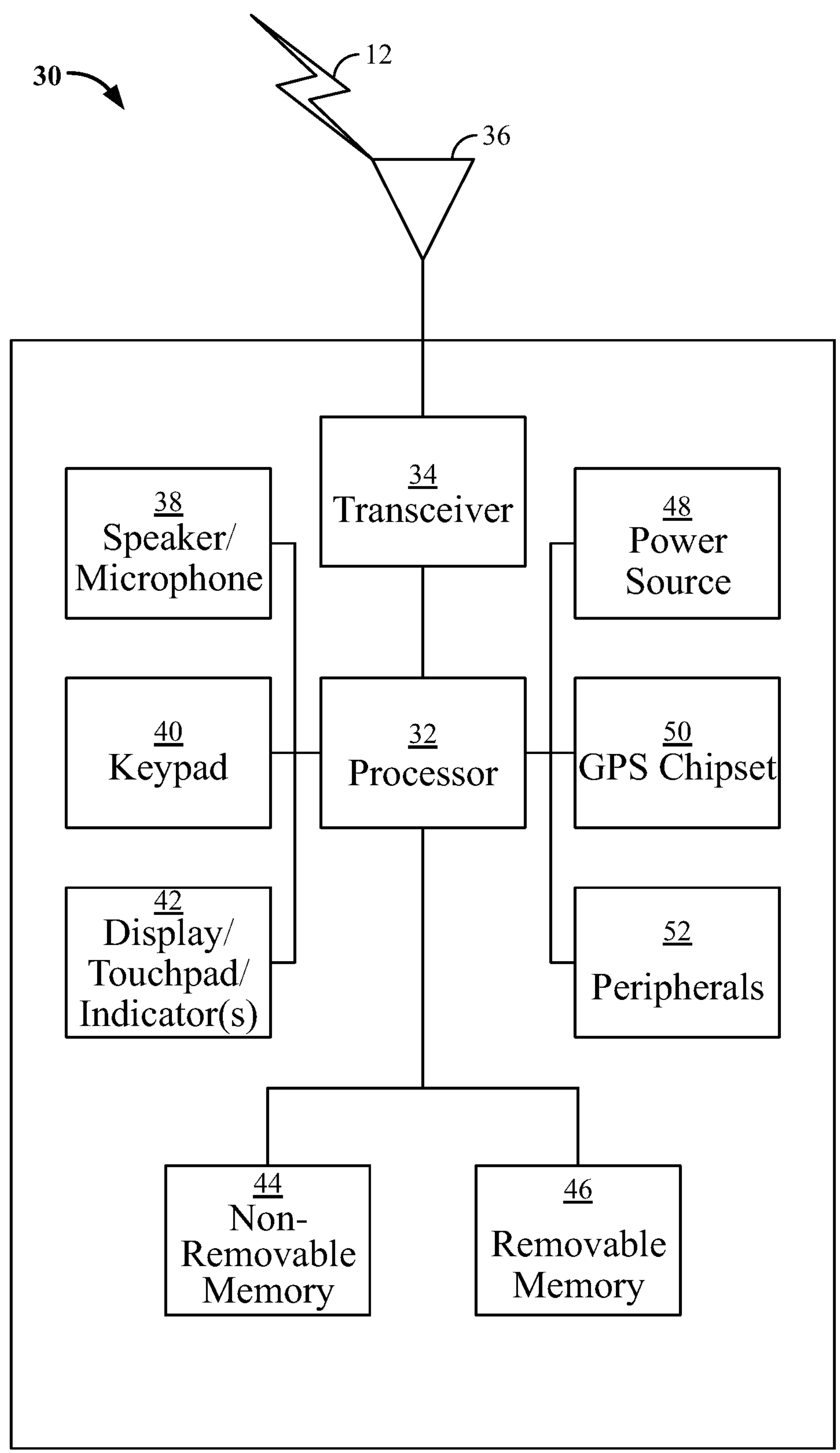
FIG. 15A is a system diagram of an example UE with which one or more disclosed embodiments may be implemented.

FIG. 15A is a system diagram of an example wireless communications device 30, such as, for example, a UE 262 or a wireless base station such as may be use to implement HeNB network 230 or WLAN AN 110. As shown in FIG. 15A, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. In an example embodiment, display/touchpad/indicator(s) 42 may comprise one or more indicators that operate as part of a user interface. It will be appreciated that the device 30 may include any sub-combination of the foregoing elements while remaining consistent with an embodiment. The device 30 of FIG. 15A may be a device that uses the serving gateway extensions for inter-system mobility systems and methods as discussed above.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 15A depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, and/or receive signals from, an eNode-B, Home eNode-B, WiFi access point, etc. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 15A as a single element, the device 30 may include any number of transmit/receive elements 36. More specifically, the device 30 may employ MIMO technology. Thus, in an embodiment, the device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling the device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 30 may receive power from the power source 48, and may be configured to distribute and/or control the power to the other components in the device 30. The power source 48 may be any suitable device for powering the device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 15B:
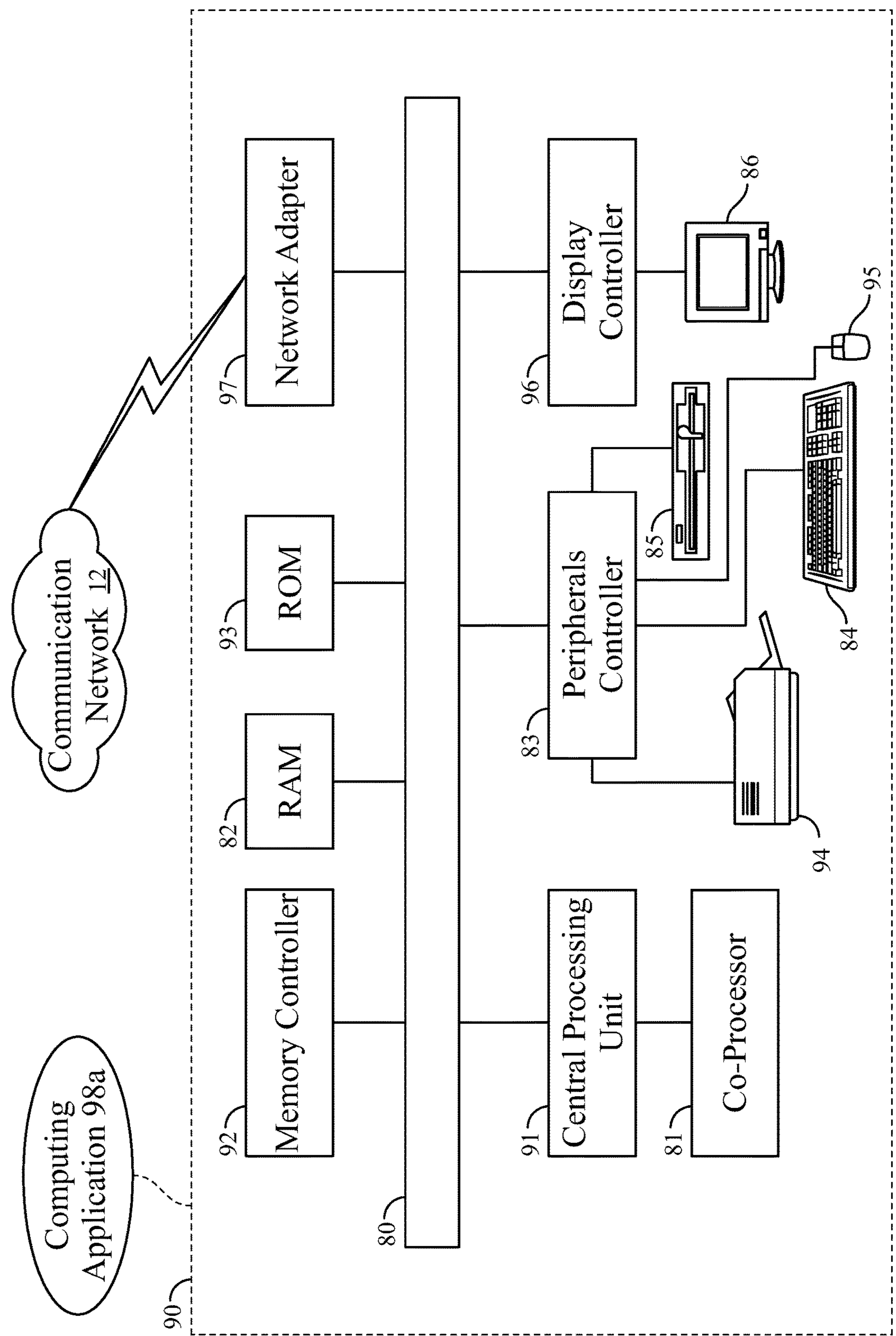
FIG. 15B is a system diagram of an example computing system that may be used to implement the systems and methods described herein.

FIG. 15B depicts a block diagram of an exemplary computing system 90 that may be used to implement the systems and methods described herein. For example, the computing system 1000 may be used to implement devices that operate as, for example, ISW GW 290, MME 234, SGW 238, WLAN 210, TWAP 260, PGW 222, and 3GPP AAA server 218 such as referenced herein. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed inter-system mobility systems and methods as disclosed above including, for example, that discussed in connection with ISW GW 290, MME 234, SGW 238, WLAN 210, TWAP 260, PGW 222, and 3GPP AAA server 218.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as PDNs. In an embodiment, network adaptor 97 may receive and transmit data related to the disclosed serving gateway extensions for inter-system mobility systems and methods.

Accordingly, applicants have disclosed improved systems and methods for inter-system mobility in integrated wireless networks. An ISW GW is integrated with a mobility management entity (MME) and serving gateway (SGW) and has interfaces with both a 3GPP access network and a TWAN. The ISW GW operates as a common control gateway and a common user gateway for both LTE networks and TWANs. User equipment (UE) by means of the ISW GW is able to access the capabilities of a packet data network (PDN) through either the LTE network or TWAN. Further, the ISW GW provides for an existing communication connection between a UE and a PDN to be handed over from one of the LTE network or TWAN to the other. Still further, the ISW GW supports simultaneously maintaining two communication paths, one via the LTE network and one via the TWAN, between a UE and a packet network.

The disclosed systems and methods may result in various benefits. For example, communication performance is improved by enabling execution of inter-system mobility procedures close to the edge of the network. Communication latency is reduced by minimizing the need for signaling procedures deep in the core network, i.e., toward the PGW. This can be especially beneficial when an MNO deploys both small cell and WiFi access in a common geographic area. Scalability is also improved by reducing the PGW processing burden, e.g., by distributing some inter-system mobility functions to the MME and SGW.

The ability to establish concurrent connections, one via LTE and one via WiFi improves mobility robustness and reduces handover ping-ponging. An alternate path to the PDN can be made available as needed without incurring handover setup delays. This improves the user experience by reducing session interruptions when the primary data path is degraded, which can be a common occurrence given the limited coverage of small cell and WiFi access points.

It will be appreciated that while illustrative embodiments have been disclosed, the scope of potential embodiments is not limited to those explicitly set out. For example, while the system has been described with primary reference to "Trusted" WLAN Access Networks (TWAN), the envisioned embodiments extend as well to embodiments that employ "Untrusted" WLANs. Moreover, it will be appreciated that the disclosed embodiments are not limited to the particular protocols and message formats that are disclosed herein, but rather, may employ any suitable protocol and formatting. Still further, while the disclosed embodiments make reference to the ISW GW, it will be appreciated that the functionality associated with the ISW GW may be incorporated into another component such as, for example, an HeNB GW or MME.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems or devices, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

The following is a list of acronyms relating to service level technologies that may appear in the above description.

AAA Authentication, Authorization, and Accounting
ANDSF Access Network Discovery and Selection Function
ANQP Access Network Query Protocol
AP Access Point
APN Access Point Name
CAPWAP Control and Provisioning of Wireless Access Points
DHCP Dynamic Host Configuration Protocol
EAP Extensible Authentication Protocol
EAP-AKA EAP Authentication and Key Agreement
EAP-AKA' EAP AKA "prime"
EAPoL EAP over LAN
EPC Evolved Packet Core
ePDG Evolved Packet Data Gateway
GPRS General Packet Radio Service
GTP GPRS Tunneling Protocol
HeNB Home evolved Node B
HSS Home Subscriber Server
IETF Internet Engineering Task Force
IKEv2 Internet Key Exchange Protocol Version 2
IMSI International Mobile Subscriber Identity
IP Internet Protocol
ISW Integrated Small-cell and WiFi
ISWN Integrated Small-cell and WiFi Networks
LTE Long Term Evolution
MAC Medium Access Control
MAPCON Multi Access PDN Connectivity
MCN Mobile Core Network
MME Mobility Management Entity
MNO Mobile Network Operator
NAS Non Access Stratum
OAM Operations, Administration, and Maintenance
PCRF Policy and Charging Rules Function
PDN Packet Data Network
PGW PDN Gateway
PMIP Proxy Mobile IP
QoE Quality of Experience
QoS Quality of Service
RAT Radio Access Technology
RRC Radio Resource Control
SaMOG S2a Mobility Over GTP
SCF Small Cell Forum
SCTP Stream Control Transmission Protocol
SGW Serving Gateway
SNMP Simple Network Management Protocol
TEID Tunneling Endpoint Identifier
TWAG Trusted WLAN Access Gateway
TWAN Trusted WLAN Access Network
TWAP Trusted WLAN AAA Proxy
UDP User Datagram Protocol
UE User Equipment
USIM UMTS Subscriber Identity Module
WBA Wireless Broadband Alliance
WFA WiFi Alliance
WLAN Wireless Local Area Network
WLC Wireless LAN Controller
WLCP Wireless LAN Control Protocol Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A network apparatus comprising a processor and a memory, the memory storing computer executable instructions which, when executed by the processor, cause the network apparatus to perform operations comprising:

receiving, over a first interface and through a wireless local area network (WLAN) access node, a first create session request message comprising an indication of a handover of a user equipment (UE) session from a home evolved node B (HeNB) to a trusted WLAN, an access point name (APN), a multi-connection indication, an identifier of the UE, and a radio access technology (RAT) type;

sending, over a second interface and to a control plane entity, a second create session request message comprising the handover indication, the APN, the multi-connection indication, the identifier of the UE, and the RAT type;

receiving, over the second interface and from the control plane entity, a first create session response message, wherein the create session response message comprises general packet radio service (GPRS) tunneling protocol (GTP) tunnel information and bearer parameters of a session indicated by the create session response message; and sending, over the first interface and to the WLAN access node, a second create session response message comprising the GTP tunnel information and the bearer parameters, wherein at least one of the create session request message and the create session response message comprises an indication of a multi-connection access routing policy.

2. The apparatus of claim 1, wherein:

the first interface is configured to support communications between the trusted WLAN and a WiFi (ISW) gateway; and the second interface is configured to support communications between the ISW gateway and the control plane entity.

3. The apparatus of claim 1, wherein the create session request message further comprises at least one of a service set identifier (SSID) or a basic service set identifier (BSSID).

4. The apparatus of claim 1, wherein the handover is initiated by the UE determining to handover an existing connection from the HeNB to the trusted WLAN.

5. The apparatus of claim 4, wherein the trusted WLAN sends to the UE an indication that the handover was successful.

6. The apparatus of claim 1, wherein the create session request message is sent to one of a 5G-GUTI or a 5G-S-TMSI.

7. A method performed in a communication network comprising an integrated small cell and WiFi (ISW) gateway, the method comprising:

receiving, over a first interface and through a wireless local area network (WLAN) access node, a first create session request message comprising an indication of a handover of a user equipment (UE) session from a home evolved node B (HeNB) to a trusted WLAN, an access point name (APN), a multi-connection indication, an identifier of the UE, and a radio access technology (RAT) type;

sending, over a second interface and to a control plane entity, a second create session request message comprising the handover indication, the APN, the multi-connection indication, the identifier of the UE, and the RAT type;

receiving, over the second interface and from the control plane entity, a first create session response message, wherein the create session response message comprises general packet radio service (GPRS) tunneling protocol (GTP) tunnel information and bearer parameters of a session indicated by the create session response message; and sending, over the first interface and to the WLAN access node, a second create session response message comprising the GTP tunnel information and the bearer parameters, wherein at least one of the create session request message and the create session response message comprises an indication of a multi-connection access routing policy.

8. The method of claim 7, wherein:

the first interface is configured to support communications between the trusted WLAN and a WiFi (ISW) gateway; and the second interface is configured to support communications between the ISW gateway and the control plane entity.

9. The method of claim 7, wherein the create session request message further comprises at least one of a service set identifier (SSID) or a basic service set identifier (BSSID).

10. The method of claim 7, wherein the handover is initiated by the UE determining to handover an existing connection from the HeNB to the trusted WLAN.

11. The method of claim 10, wherein the trusted WLAN sends to the UE an indication that the handover was successful, the indication comprising an IP address previously allocated for the UE.

12. The method of claim 7, wherein the create session request message is sent to one of a 5G-GUTI or a 5G-S-TMSI.

13. A communication system comprising a user equipment (UE), a wireless local area network (WLAN) access node, a network apparatus and a control plane entity, wherein the communication system is configured to perform operations comprising:

receiving, from the UE at the network apparatus over a first interface and through the WLAN access node, a first create session request message comprising an indication of a handover of a user equipment (UE) session from a home evolved node B (HeNB) to a trusted WLAN, an access point name (APN), a multi-connection indication, an identifier of the UE, and a radio access technology (RAT) type;

sending, from the network apparatus over a second interface and to the control plane entity, a second create session request message comprising the handover indication, the APN, the multi-connection indication, the identifier of the UE, and the RAT type;

receiving, at the network apparatus over the second interface and from the control plane entity, a first create session response message, wherein the create session response message comprises general packet radio service (GPRS) tunneling protocol (GTP) tunnel information and bearer parameters of a session indicated by the create session response message; and sending, from the network apparatus over the first interface and to the WLAN access node, a second create session response message comprising the GTP tunnel information and the bearer parameters, wherein at least one of the create session request message and the create session response message comprises an indication of a multi-connection access routing policy.

14. The communication system of claim 13, wherein the handover is initiated by the UE determining to handover an existing connection from the HeNB to the trusted WLAN.

15. The communication system of claim 14, wherein the trusted WLAN sends to the UE an indication that the handover was successful, the indication comprising an IP address previously allocated for the UE.

16. A user equipment (UE) in a wireless communication system, the wireless communication system comprising a wireless local area network (WLAN) access node, a network apparatus and a control plane entity, wherein the UE is configured to perform operations comprising:

transmitting, to the network apparatus through the WLAN access node, a first create session request message comprising an indication of a handover of a user equipment (UE) session from a home evolved node B (HeNB) to a trusted WLAN, an access point name (APN), a multi-connection indication, an identifier of the UE, and a radio access technology (RAT) type;

determining to handover an existing connection from the HeNB to the trusted WLAN to initiate the handover; and receiving an indication that the handover was successful, the indication comprising an IP address previously allocated for the UE, the indication being transmitted from the trusted WLAN upon a second create session response message comprising the GTP tunnel information and the bearer parameters being received at the WLAN access node, wherein at least one of the create session request message and the create session response message comprises an indication of a multi-connection access routing policy, and wherein, the network apparatus is configured to:

send in response to the first create session request message, over a second interface and to the control plane entity, a second create session request message comprising the handover indication, the APN, the multi-connection indication, the identifier of the UE, and the RAT type;

receive, over the second interface and from the control plane entity, a first create session response message, wherein the create session response message comprises general packet radio service (GPRS) tunneling protocol (GTP) tunnel information and bearer parameters of a session indicated by the create session response message; and transmit, in response to the first create session response message, the second create session response message to the WLAN access node.

* * * * *